US010703955B2

(12) United States Patent
Shimaoka et al.

(10) Patent No.: US 10,703,955 B2
(45) Date of Patent: *Jul. 7, 2020

(54) COMPOSITION COMPRISING ULTRAFINE CELLULOSE FIBERS

(71) Applicant: OJI HOLDINGS CORPORATION, Tokyo (JP)

(72) Inventors: Takayuki Shimaoka, Tokyo (JP); Yuichi Noguchi, Tokyo (JP); Ikue Homma, Tokyo (JP); Mitsuru Tsunoda, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 23 days.

This patent is subject to a terminal disclaimer.

(21) Appl. No.: 15/322,345

(22) PCT Filed: Jun. 29, 2015

(86) PCT No.: PCT/JP2015/068617
§ 371 (c)(1),
(2) Date: Apr. 20, 2017

(87) PCT Pub. No.: WO2016/002689
PCT Pub. Date: Jan. 7, 2016

(65) Prior Publication Data
US 2017/0226398 A1 Aug. 10, 2017

(30) Foreign Application Priority Data

Jun. 30, 2014 (JP) ................................ 2014-134082
Oct. 15, 2014 (JP) ................................ 2014-211021

(51) Int. Cl.
*C09K 8/10* (2006.01)
*C09K 8/68* (2006.01)
(Continued)

(52) U.S. Cl.
CPC .................. *C09K 8/10* (2013.01); *C08B 5/00* (2013.01); *C08L 1/16* (2013.01); *C09K 8/035* (2013.01);
(Continued)

(58) Field of Classification Search
CPC ........ C09K 8/10; C09K 8/90; C09K 2208/08; C08B 5/00; C08L 1/16
(Continued)

(56) References Cited

U.S. PATENT DOCUMENTS 4,990,609 A * 2/1991 Herzog .................. C08B 11/10
536/120
5,703,225 A * 12/1997 Shet ........................ A61L 15/28
34/95

(Continued)

FOREIGN PATENT DOCUMENTS

JP          6-206954 A      7/1994
JP       2001-517251 A     10/2001
(Continued)

OTHER PUBLICATIONS

International Preliminary Report on Patentability and Written Opinion of the International Searching Authority (Forms PCT/IB/338, PCT/IB/373, PCT/ISA/237 and PCT/IB/326) for International Application No. PCT/JP2015/068617, dated Jan. 12, 2017, with an English translation.

(Continued)

*Primary Examiner* — Aiqun Li
(74) *Attorney, Agent, or Firm* — Birch, Stewart, Kolasch & Birch, LLP

(57) ABSTRACT

The object is to provide a subterranean formation processing composition which has a highly stable viscosity against change in temperature and a high water stopping property. A subterranean formation processing composition comprising (Continued)

cellulose fibers wherein the composition contains ultrafine cellulose fibers having 0.14 to 2.5 mmol/g of a substituent is used. The substituent is preferably an anion group, particularly a phosphoric acid group. The present invention relates to various fluids which are used in well processing. The present invention relates to a method for processing a subterranean formation, for example, drilling of an exploratory well or a wildcat, an appraisal well, an exploratory well or an exploration well, a delineation well, a development well, a production well, an injection well, an observation well, and a service well; cementing; fracturing; and a method for producing petroleum resources. The present invention provides also a cellulose fiber-containing composition which is not limited to the subterranean formation processing use.

12 Claims, 1 Drawing Sheet

(51) Int. Cl.

| | | |
|---|---|---|
| *C09K 8/90* | (2006.01) | |
| *C09K 8/035* | (2006.01) | |
| *C08B 5/00* | (2006.01) | |
| *C08L 1/16* | (2006.01) | |
| *C09K 8/514* | (2006.01) | |
| *C09K 8/40* | (2006.01) | |
| *C09K 8/42* | (2006.01) | |
| *C09K 8/575* | (2006.01) | |
| *C09K 8/72* | (2006.01) | |
| *C09K 8/92* | (2006.01) | |
| *C09K 8/70* | (2006.01) | |
| *C09K 8/516* | (2006.01) | |

(52) U.S. Cl.
CPC .................. *C09K 8/40* (2013.01); *C09K 8/42* (2013.01); *C09K 8/5758* (2013.01); *C09K 8/68* (2013.01); *C09K 8/725* (2013.01); *C09K 8/90* (2013.01); *C09K 8/514* (2013.01); *C09K 8/516* (2013.01); *C09K 8/70* (2013.01); *C09K 8/92* (2013.01); *C09K 2208/08* (2013.01)

(58) Field of Classification Search
USPC ........................................................ 507/104
See application file for complete search history.

(56) References Cited

U.S. PATENT DOCUMENTS

| | | | |
|---|---|---|---|
| 6,348,436 B1 | 2/2002 | Langlois et al. | |
| 2003/0176293 A1* | 9/2003 | Schilling | C09K 8/08 507/104 |
| 2009/0291875 A1* | 11/2009 | Lant | C11D 3/38636 510/320 |
| 2012/0328877 A1* | 12/2012 | Shiramizu | B82Y 40/00 428/401 |
| 2013/0035263 A1 | 2/2013 | Laukkanen et al. | |
| 2013/0196883 A1 | 8/2013 | Rincon-Torres et al. | |
| 2013/0274149 A1 | 10/2013 | Lafitte et al. | |
| 2013/0338250 A1 | 12/2013 | Umemoto et al. | |
| 2015/0368540 A1 | 12/2015 | Monclin et al. | |

FOREIGN PATENT DOCUMENTS

| | | |
|---|---|---|
| JP | 2010-37348 A | 2/2010 |
| JP | 2010-254726 A | 11/2010 |
| JP | 2011-162608 A | 8/2011 |
| JP | 2011-185122 A | 9/2011 |
| JP | 2013-136859 A | 7/2013 |
| JP | 2013-185122 A | 9/2013 |
| JP | 5296445 B2 | 9/2013 |
| JP | 2015-508839 A | 3/2015 |
| WO | WO 96/40599 A1 | 12/1996 |
| WO | WO 2012/107642 A1 | 8/2012 |
| WO | WO 2012/115115 A1 | 8/2012 |
| WO | WO 2013/073652 A1 | 5/2013 |
| WO | WO 2013/121086 A1 | 8/2013 |
| WO | WO 2013/176033 A1 | 11/2013 |
| WO | WO 2013/176049 A1 | 11/2013 |
| WO | WO 2014/024876 A1 | 2/2014 |
| WO | WO 2015/029960 A1 | 3/2015 |

OTHER PUBLICATIONS

International Search Report and Written Opinion of the International Searching Authority (Forms PCT/ISA/220, PCT/ISA/210 and PCT/ISA/237) for International Application No. PCT/JP2015/068617, dated Oct. 6, 2015.
Saito et al., "Homogeneous Suspensions of Individualized Microfibrils from TEMPO-Catalyzed Oxidation of Native Cellulose," Biomacromolecules, vol. 7, No. 6, Jun. 2006 (Published on Web May 3, 2006), pp. 1687-1691.
Van Den Berg et al., "Preparation of Homogeneous Dispersions of Tunicate Cellulose Whiskers in Organic Solvents," Biomacromolecules, vol. 8, No. 4, 2007 (Published on Web Mar. 8, 2007), pp. 1353-1357.
Japanese Office Action dated Aug. 21, 2018, issued in corresponding Japanese Patent Application No. 2016-531348.
International Preliminary Report on Patentability and Written Opinion of the International Searching Authority (Forms PCT/IB/338, PCT/ISA/237, PCT/IB/326 and PCT/IB/373) for International Application No. PCT/JP2015/068616, dated Jan. 12, 2017, with an English translation.
International Search Report and Written Opinion of the International Searching Authority (Forms PCT/ISA/220, PCT/ISA/210 and PCT/ISA/237) for International Application No. PCT/JP2015/068616, dated Oct. 6, 2015.
Non-Final Office Action dated Aug. 8, 2018, issued in U.S. Appl. No. 15/322,382.
Notice of Allowance dated Feb. 25, 2019, issued in U.S. Appl. No. 15/322,382.
Office Action dated Apr. 9, 2018, issued in U.S. Appl. No. 15/322,382.
Notice of Allowance dated Oct. 8, 2019, issued in U.S. Appl. No. 15/322,382.

\* cited by examiner

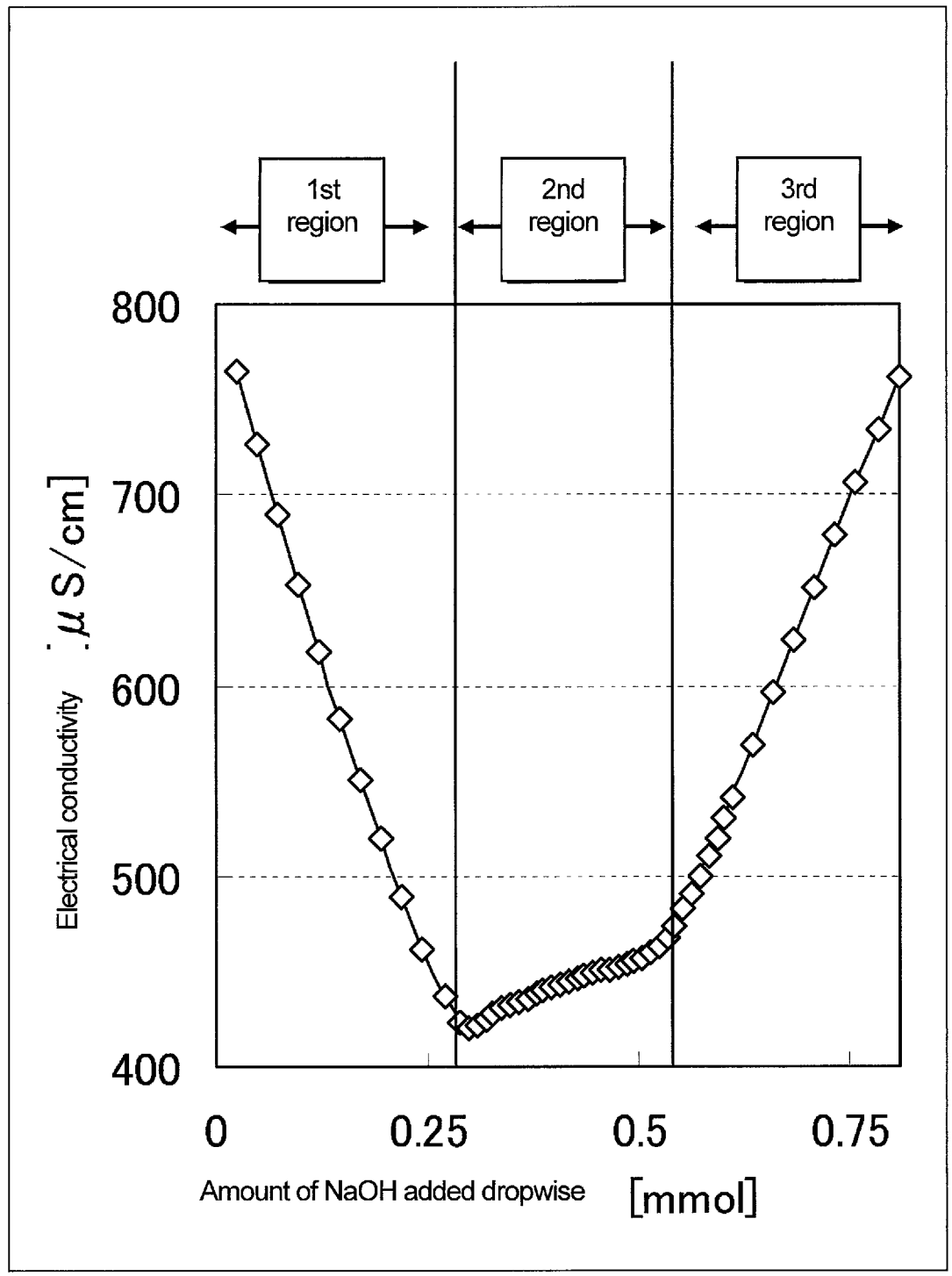

COMPOSITION COMPRISING ULTRAFINE CELLULOSE FIBERS

TECHNICAL FIELD

The present invention relates to a subterranean formation processing composition that comprises ultrafine cellulose fibers and has a stable viscosity against change in temperature and a high water stopping property. The present invention also relates to a composition that comprises ultrafine cellulose fibers and contains ultrafine fibers stable viscosity against change in temperature. The present invention further relates to a method capable of efficiently concentrating or drying a cellulose dispersion even in an aqueous solution containing a salt, and further re-dispersing the concentrate liquid or the dried product, and such a concentrate liquid or a dried product.

BACKGROUND ART

Natural resources present in subterranean formations or zones, such as gas, petroleum, and water are usually recovered by making a borehole so as to reach a subterranean formation while circulating a drilling fluid in the borehole. A fluid for subterranean formation processing such as a fracturing fluid, mud water, a cementing fluid, a well control fluid, a well kill fluid, an acid fracturing fluid, an acid diverting fluid, a stimulation fluid, a sand control fluid, a completion fluid, a wellbore consolidation fluid, a remediation treatment fluid, a spacer fluid, a drilling fluid, a frac-packing fluid, a water conformance fluid, or a gravel packing fluid is used for the recovery of petroleum or gas.

The subterranean formation processing fluid is supplemented with additives such as a lost circulation preventing agent, a density agent, a dispersant, a surfactant, a viscosity adjuster, and a thickener. For example, the mud water is prepared by dispersing bentonite, mica, hydrated lime, carboxymethylcellulose, silicone resin, and the like in a liquid carrier such as water or an organic solvent for the purpose of, for example, reducing the friction between a drill and side walls, cooling a bit, taking crushed rocks out, preventing exfiltration or lost circulation during drilling operation, or preventing the collapse of side walls formed by excavation.

In the recent production of petroleum or natural gas, very deep well drilling has been practiced. Thus, there has been a demand for a material for subterranean formation processing fluids that resists high temperatures. A polymer containing a prepolymer having no LCST (lower critical solution temperature) and a prepolymer having LCST (lower critical solution temperature) has been reported as a composition whose viscosity is increased with elevation in temperature (Patent Literature 1).

Meanwhile, fine cellulose fibers (Patent Literature 2) and cellulose nanocrystals produced by an acid hydrolysis method (Patent Literature 3) are known as components of thickeners for such purposes. Also, a composition for subterranean formation processing comprising nanocrystalline cellulose has been proposed (Patent Literature 4). In recent years, a revolutionary method for producing nanosized ultrafine cellulose fibers with cellulose crystallinity maintained has been further developed (Non Patent Literature 1). In this method, an aldehyde group or a carboxy group is introduced to the surface of cellulose fibers, followed by machine processing to generate fine cellulose fibers. Unlike cellulose nanocrystals, the ultrafine cellulose fibers obtained by this method retain a non-crystalline region in addition to a crystalline region. Therefore, long fibers are obtained and can make a gel having a high viscosity in water. Use of the ultrafine cellulose fibers produced by this method in cosmetic thickeners or drilling thickeners has been proposed (Patent Literatures 5 and 6).

For the production of ultrafine cellulose fibers, the ultrafine cellulose fibers are often produced at a solid concentration of 5% by mass or smaller and are provided as a low-concentration gel. A method for increasing the solid concentration has been proposed because of reduction in transportation cost or poor handleability attributed to a large amount of water (Patent Literatures 7, 8, and 9).

The ultrafine cellulose fibers are also used as a highly viscous thickener. For use in cosmetic thickeners, drilling thickeners, or the like, products are often supplemented with salts. Thus, the ultrafine cellulose fibers have been required to exert viscosity even in the presence of a salt.

PRIOR ART LITERATURES

Patent Literatures

Patent Literature 1: JP Patent Publication (Kokai) No. 6-206954 A (1994)
Patent Literature 2: U.S. Pat. No. 6,348,436
Patent Literature 3: US2013/0196883
Patent Literature 4: US2013/0274149
Patent Literature 5: JP Patent Publication (Kokai) No. 2010-37348 A (JP Patent No. 5296445)
Patent Literature 6: US2013/0035263
Patent Literature 7: WO2012/107642
Patent Literature 8: JP Patent Publication (Kohyo) No. 2015/508839 A
Patent Literature 9: WO2014/024876

Non Patent Literatures

Non Patent Literature 1: Saito T & al., Homogeneous suspensions of individualized microfibrils from TEMPO-catalyzed oxidation of native cellulose. Biomacromolecules 2006, 7 (6), 1687-91

DISCLOSURE OF INVENTION

Object to be Solved by the Invention

When the underground temperature is elevated, it is desirable for cost reduction that a low concentration of a thickener contained in a drilling liquid should be able to maintain its viscosity even at a high temperature. If a drilling liquid can be supplemented with a composition excellent in the function of suppressing the collapse of walls (water stopping property), very deep drilling is efficiently achieved because water penetration to the walls can be suppressed. Also, use of a highly biodegradable thickener can reduce risks to the environment and is therefore desirable.

A subterranean formation processing composition that has a stable viscosity against change in temperature and a high water stopping property is desirable.

Meanwhile, Patent Literature 7 has proposed a method for dehydrating a gel of ultrafine cellulose fibers using ethanol. This method, however, employs a large amount of ethanol and is not a commercial process from the viewpoint of cost. Patent Literature 8 discloses a method for concentrating a gel of ultrafine cellulose fibers using an acid. Ultrafine cellulose fibers surface-modified with a carboxy group are used therein. The concentration method using an acid, however, cannot be used in the concentration of ultrafine cellulose fibers modified with a strongly acidic group such as a sulfone group or a phosphoric acid group, and is thus low versatile. In addition, the acid treatment weakens the surface charge of the modifying group, resulting in low re-dispersibility when the concentrate is re-dispersed. Patent Literature 9 discloses concentration using a polyvalent ion which is also capable of concentrating ultrafine cellulose fibers modified with a strongly acidic group. The polyvalent ion, however, remains in the system and might influence subsequent use. In addition, unfortunately, the resulting ultrafine cellulose fibers cannot be provided as a dried product.

A highly versatile method performed at a low cost is desirable for the concentration or drying of ultrafine cellulose fibers.

In an attempt to re-disperse a concentrate or a dried product of ultrafine cellulose fibers with their charge increased by chemical surface modification in an aqueous solution containing a salt, the presence of the salt weakens the repulsion of the surface charge of the ultrafine cellulose fibers and deteriorates dispersibility. In some cases, the resulting ultrafine cellulose fibers are disadvantageously precipitated and do not exert a viscosity.

An approach for exerting favorable re-dispersibility and high viscosity even in the presence of a salt is desirable for the concentration or drying of ultrafine cellulose fibers.

Means for Solving the Object

The present inventors have conducted diligent studies to solve the problems described above. As a result, the present inventors have found that an aqueous solution containing ultrafine cellulose fibers can maintain a high viscosity even at a high temperature and has a high water stopping property.

The present inventors have also found that a more highly versatile method for concentrating or drying ultrafine cellulose fibers at lower cost than ever can be provided by combining a polyvalent ion and an acid or a polyvalent ion and an organic solvent in the concentration or drying method. The present inventors have further found that re-dispersibility is also enhanced by adjusting the pH of a re-dispersion of the concentrate liquid or the dried product.

The present inventors have further found that ultrafine cellulose fibers exert high viscosity even in salt water by dispersing in advance the ultrafine cellulose fibers in a concentrated or dried form in an aqueous solution having a low salt concentration and then adding a salt to the dispersion.

Specifically, the present invention provides the following:
[1] A subterranean formation processing composition comprising cellulose fibers, wherein the composition contains ultrafine cellulose fibers having 0.14 to 2.5 mmol/g of a substituent
[2] The composition according to [1] above, wherein the substituent is an anion group.
[3] The composition according to [1] or [2] above, wherein the substituent is introduced by esterification reaction.
[4] The composition according to any one of [1] to [3] above, wherein the substituent is a phosphoric acid group or a sulfone group.
[5] The composition according to any one of [1] to [4] above, wherein the cellulose fibers have 5% or more of a non-crystalline region.
[6] The composition according to any one of [1] to [5] above, wherein the viscosity at a temperature of 30° C. to 80° C. is 60% or more with respect to the viscosity at 25° C. when the composition is dispersed in water such that the solid concentration of the cellulose fibers is 0.2 to 0.4% by mass.
[7] The composition according to any one of [1] to [6] above, wherein the composition has a water stopping property.
[8] The composition according to any one of [1] to [7] above for use in the addition to a subterranean formation processing fluid.
[9] The composition according to any one of [1] to [8] above for use in the addition to mud water, a fracturing fluid, a cementing fluid, a well control fluid, a well kill fluid, an acid fracturing fluid, an acid diverting fluid, a stimulation fluid, a sand control fluid, a completion fluid, a wellbore consolidation fluid, a remediation treatment fluid, a spacer fluid, a drilling fluid, a frac-packing fluid, a water conformance fluid, or a gravel packing fluid.
[10] A concentrate liquid or a dried product of a composition according to any one of [1] to [9] above.
[11] The concentrate liquid or the dried product according to [10] above, wherein the solid concentration of the cellulose fibers is 5% by mass or more and 100% by mass or smaller.
[12] The concentrate liquid or the dried product according to [11] above which is produced by a production method comprising a step of adding a concentrating agent selected from the group consisting of a salt of a polyvalent metal, a cationic surfactant, and a cationic polymer coagulant to the composition according to any one of [1] to [9] above to adjust the solid concentration of the cellulose fibers to 5% by mass or more.
[13] The concentrate liquid or the dried product according to [12] above, wherein the production method further comprises a step of dipping the concentrating agent-containing concentrate liquid or dried product in which the solid concentration of the cellulose fibers is 5% by mass or more, in an acidic liquid to remove the concentrating agent.
[14] The concentrate liquid or the dried product according to [12] above, wherein the production method further comprises a step of dipping the concentrating agent-containing concentrate liquid or dried product in which the solid concentration of the cellulose fibers is 5% by mass or more, in a liquid comprising an organic solvent.
[15] A fluid comprising a dispersion of ultrafine cellulose fibers prepared by dispersing a concentrate or a dried product according to any one of [10] to [14] above in a liquid, wherein the pH of the dispersion is 7 to 14 when the ultrafine cellulose fibers have no or negative surface charge, and the pH of the dispersion is 2 to 7 when the ultrafine cellulose fibers have positive surface charge.

The present invention further provides the following:
[1] A subterranean formation processing composition comprising cellulose fibers, wherein the composition contains ultrafine cellulose fibers having 0.14 to 2.5 mmol/g of a substituent.
[2] The composition according to [1] above, wherein the substituent is an anion group.
[3] The composition according to [1] or [2] above, wherein the substituent is introduced by esterification reaction.
[4] The composition according to any one of [1] to [3] above, wherein the substituent is a phosphoric acid group or a sillfone group.
[5] The composition according to any one of [1] to [4] above, wherein the cellulose fibers are derived from wood.

[6] The composition according to any one of [1] to [5] above, wherein the cellulose fibers have 5% or more of a non-crystalline region.

[7] The composition according to any one of [1] to [5] above, wherein the cellulose fibers have 10% or more of a non-crystalline region.

[8] The composition according to any one of [1] to [5] above, wherein the cellulose fibers have 20% or more of a non-crystalline region.

[9] The composition according to any one of [1] to [8] above, wherein the viscosity at a temperature of 30° C. to 80° C. is 60% or more with respect to the viscosity at 25° C. when the composition is dispersed in water such that the solid concentration of the cellulose fibers is 0.2 to 0.4% by mass.

[10] The composition according to any one of [1] to [9] above, wherein the composition has a water stopping property.

[11] The composition according to any one of [1] to [10] above for use in the addition to a subterranean formation processing fluid.

[12] The composition according to any one of [1] to [10] above for use in the addition to mud water, a fracturing fluid, a cementing fluid, a well control fluid, a well kill fluid, an acid fracturing fluid, an acid diverting fluid, a stimulation fluid, a sand control fluid, a completion fluid, a wellbore consolidation fluid, a remediation treatment fluid, a spacer fluid, a drilling fluid, a frac-packing fluid, a water conformance fluid, or a gravel packing fluid.

[13] A concentrate liquid or a dried product of a composition according to any one of [1] to [12] above.

[14] The concentrate liquid or the dried product of the composition according to [13] above, wherein the solid concentration of the cellulose fibers is 5% by mass or more and 100% by mass or smaller.

[15] The concentrate liquid or the dried product according to [14] above which is produced by a production method comprising a step of adding a concentrating agent selected from the group consisting of a salt of a polyvalent metal, a cationic surfactant, and a cationic polymer coagulant to the composition according to any one of [1] to [12] above to adjust the solid concentration of the cellulose fibers to 5% by mass or more.

[16] The concentrate liquid or the dried product according to [15] above, wherein the production method further comprises a step of dipping the concentrating agent-containing concentrate liquid or dried product in which the solid concentration of the cellulose fibers is 5% by mass or more, in an acidic liquid to remove the concentrating agent.

[17] The concentrate liquid or the dried product according to [15] above, wherein the production method further comprises a step of dipping the concentrating agent-containing concentrate liquid or dried product in which the solid concentration of the cellulose fibers is 5% by mass or more, in a liquid comprising an organic solvent.

[18] The concentrate liquid or the dried product according to [17] above, wherein the liquid comprising an organic solvent comprises an alkali or an acid.

[19] The concentrate liquid or the dried product according to any one of [15] to [18] above which is produced by a production method comprising a step of adding an organic solvent to the composition according to any one of claims 1 to 12 above in which the solid concentration of the cellulose fibers is less than 20% by mass, to adjust the solid concentration of the cellulose fibers to 20% by mass or more.

[20] The concentrate liquid or the dried product according to any one of [15] to [18] above which is produced by a production method comprising a step of evaporating water by the heating of the composition according to any one of claims 1 to 12 above in which the solid concentration of the cellulose fibers is less than 20% by mass, to adjust the solid concentration of the cellulose fibers to 20% by mass or more.

[21] A fluid comprising a dispersion of ultrafine cellulose fibers prepared by dispersing a concentrate or a dried product according to any one of [13] to [20] above in a liquid, wherein the pH of the solution after the dispersion is 7 to 14 when the ultrafine cellulose fibers have no or negative surface charge, and the pH of the solution after the dispersion is 2 to 7 when the ultrafine cellulose fibers have positive surface charge.

[22] A subterranean formation processing fluid comprising a composition according to any one of [1] to [12] above, wherein the solid concentration of the cellulose fibers is 0.05 to 2% by mass.

[23] A subterranean formation processing fluid comprising a composition according to any one of [1] to [12] above and any member selected from the group consisting of a weighting material, a viscosity adjuster, a dispersant, a coagulant, a lost circulation preventing agent, a pH adjuster, a friction reducer, a hygroscopic expansion controlling agent, an emulsifier, a surfactant, a biocide, an antifoaming agent, a scale preventive, a corrosion inhibitor, a temperature stabilizer, a resin coating agent, a crack support material, a salt, a proppant, and an oxidizing agent.

[24] The fluid according to [22] or [23] above which is a fracturing fluid, mud water, or a cementing fluid.

[25] A method for producing a subterranean formation processing fluid according to any one of [22] to [24] above, comprising a step of re-dispersing a concentrate liquid or a dried product according to any one of [13] to [20] above by mixing with an aqueous solvent having a salt concentration of less than 1% by mass such that the solid concentration of the cellulose fibers is less than 5% by mass, and then adding a salt to the re-dispersion to obtain a fluid having a salt concentration of 0.1% by mass or more.

[26] A method for producing a subterranean formation processing fluid according to any one of [22] to [24] above, comprising a step of re-dispersing a concentrate liquid or a dried product according to any one of [13] to [20] above by mixing with an aqueous solvent having a salt concentration of less than 1% by mass, preferably a salt concentration of less than 0.5% by mass, preferably a salt concentration of less than 0.1% by mass, more preferably a salt concentration of less than 0.05% by mass, further preferably a salt concentration of less than 0.025% by mass) (preferably a salt concentration of less than 0.1% by mass, more preferably a salt concentration of less than 0.05% by mass, further preferably a salt concentration of less than 0.025% by mass) such that the ultrafine cellulose fibers become less than 5% by mass, and then adding a salt to the re-dispersion to obtain a fluid having a salt concentration of 0.5% by mass or more.

[27] A method for producing a subterranean formation processing fluid according to any one of [22] to [24] above, comprising a step of re-dispersing a concentrate liquid or a dried product according to any one of [13] to [20] above by mixing with an aqueous solvent having a salt concentration of less than 1% by mass (preferably a salt concentration of less than 0.5% by mass, preferably a salt concentration of less than 0.1% by mass, more preferably a salt concentration of less than 0.05% by mass, further preferably a salt concentration of less than 0.025% by mass) such that the ultrafine cellulose fibers become less than 5% by mass, and then adding a salt to the re-dispersion to obtain a fluid having a salt concentration of 1.0% by mass or more.

[28] A method for processing a subterranean formation, comprising using a composition according to any one of [1] to [20] above or a fluid according to any one of [21] to [24] above.

[29] A method for producing a petroleum resource, comprising using a composition according to any one of [1] to [20] above or a fluid according to any one of [21] to [24] above.

The present invention further provides the following concentrate liquid or dried product of a composition comprising ultrafine cellulose fibers, and a re-dispersion thereof, which may be used for various purposes:

[1] A concentrate liquid or a dried product of a composition comprising ultrafine cellulose fibers having 0.14 to 2.5 mmol/g of a substituent, wherein the solid concentration of the cellulose fibers is 5% by mass or more and 100% by mass or smaller.

[2] The concentrate or the dried product according to [1] above, wherein the concentrate or the dried product is intended to re-disperse the ultrafine cellulose fibers in a liquid and is used such that the pH of the liquid after the re-dispersion is adjusted to 7 to 14 when the ultrafine cellulose fibers have no or negative surface charge, and the pH of the liquid after the re-dispersion is adjusted to the range of 2 to 7 when the ultrafine cellulose fibers have positive surface charge.

[3] The concentrate or the dried product according to [1] or [2] above which is produced by a production method comprising a step of adding a concentrating agent selected from the group consisting of a salt of a polyvalent metal, a cationic surfactant, and a cationic polymer coagulant to the composition comprising ultrafine cellulose fibers to adjust the solid concentration of the cellulose fibers to 5% by mass or more.

[4] The concentrate liquid or the dried product according to [3] above, wherein the production method further comprises a step of dipping the concentrating agent-containing concentrate liquid or dried product in which the solid concentration of the cellulose fibers is 5% by mass or more, in an acidic liquid to remove the concentrating agent.

[5] The concentrate liquid or the dried product according to [3] above, wherein the production method further comprises a step of dipping the concentrating agent-containing concentrate liquid or dried product in which the solid concentration of the cellulose fibers is 5% by mass or more, in a liquid comprising an organic solvent.

[6] The concentrate liquid or the dried product according to [5] above, wherein the liquid comprising an organic solvent comprises an alkali or an acid.

[7] The concentrate or the dried product according to [1] or [2] above which is produced by a production method comprising a step of adding an organic solvent to the composition comprising ultrafine cellulose fibers in which the solid concentration of the cellulose fibers is less than 20% by mass, to adjust the solid concentration of the cellulose fibers to 20% by mass or more.

[8] The concentrate or the dried product according to [1] or [2] above which is produced by a production method comprising a step of evaporating water by the heating of the composition comprising ultrafine cellulose fibers in which the solid concentration of the cellulose fibers is less than 20% by mass, to adjust the solid concentration of the cellulose fibers to 20% by mass or more.

[9] The concentrate liquid or the dried product according to any one of [1] to [8] above, wherein the substituent is an anion group.

[10] The concentrate liquid or the dried product according to [9] above, wherein the substituent is introduced by esterification reaction.

[11] The concentrate liquid or the dried product according to [9] or [10] above, wherein the substituent is a phosphoric acid group or a sulfone group.

[12] The concentrate liquid or the dried product according to any one of [9] to [11] above, wherein the cellulose fibers are derived from wood.

[13] The concentrate liquid or the dried product according to any one of [9] to [12] above, wherein the cellulose fibers have 5% by mass or more of a non-crystalline region.

[14] The concentrate liquid or the dried product according to any one of [9] to [12] above, wherein the cellulose fibers have 10% by mass or more of a non-crystalline region.

[15] The concentrate liquid or the dried product according to any one of [9] to [12] above, wherein the cellulose fibers have 20% by mass or more of a non-crystalline region.

[16] A re-dispersion of a concentrate liquid or a dried product according to any one of [1] to [15] above, the re-dispersion being obtained by a production method comprising a step of mixing the concentrate liquid or the dried product according to any one of [1] to [15] above with an aqueous solvent having a salt concentration of less than 1% by mass (preferably a salt concentration of less than 0.1% by mass, more preferably a salt concentration of less than 0.05% by mass, further preferably a salt concentration of less than 0.025% by mass) to obtain a re-dispersion in which the solid concentration of the cellulose fibers is less than 5% by mass, and adding a salt to the obtained re-dispersion to obtain a re-dispersion having a salt concentration of 0.1% by mass or more.

[17] A re-dispersion of a concentrate liquid or a dried product according to any one of [1] to [15] above, the re-dispersion being obtained by a production method comprising a step of mixing the concentrate liquid or the dried product according to any one of [1] to [15] above with an aqueous solvent having a salt concentration of less than 1% by mass (preferably a salt concentration of less than 0.5% by mass, preferably a salt concentration of less than 0.1% by mass, more preferably a salt concentration of less than 0.05% by mass, further preferably a salt concentration of less than 0.025% by mass) to obtain a re-dispersion in which the solid concentration of the cellulose fibers is less than 5% by mass, and adding a salt to the obtained re-dispersion to obtain a re-dispersion having a salt concentration of 0.5% by mass or more.

[18] A re-dispersion of a concentrate liquid or a dried product according to any one of [1] to [15] above, the re-dispersion being obtained by a production method comprising a step of mixing the concentrate liquid or the dried product according to any one of [1] to [15] above with an aqueous solvent having a salt concentration of less than 1% by mass (preferably a salt concentration of less than 0.5% by mass, preferably a salt concentration of less than 0.1% by mass, more preferably a salt concentration of less than 0.05% by mass, further preferably a salt concentration of less than 0.025% by mass) to obtain a re-dispersion in which the solid concentration of the cellulose fibers is less than 5% by mass, and adding a salt to the obtained re-dispersion to obtain a re-dispersion having a salt concentration of 1.0% by mass or more.

[19] The concentrate liquid or the dried product according to any one of [1] to [15] above or the re-dispersion according to any one of [16] to [18] above which is used as a thickener.

The present invention further provides the following thickener and a product using the same:

[1] A thickener comprising ultrafine cellulose fibers having 0.14 to 2.5 mmol/g of a substituent as an active ingredient, wherein the solid concentration of the cellulose fibers is 5% by mass or more and 100% by mass or smaller.

[2] The thickener according to [1] above for use in the re-dispersion of an active ingredient in a liquid, wherein the thickener is used such that the pH of the liquid after the re-dispersion is adjusted to 7 to 14 when the ultrafine cellulose fibers have no or negative surface charge, and the pH of the liquid after the re-dispersion is adjusted to the range of 2 to 7 when the ultrafine cellulose fibers have positive surface charge.

[3] The thickener according to [1] or [2] above which is produced by a production method comprising a step of adding a concentrating agent selected from the group consisting of a salt of a polyvalent metal, a cationic surfactant, and a cationic polymer coagulant to the composition comprising ultrafine cellulose fibers to adjust the solid concentration of the cellulose fibers to 5% by mass or more.

[4] The concentrate liquid or the dried product according to [3] above, wherein the production method further comprises a step of subjecting the concentrating agent-containing concentrate liquid or dried product in which the solid concentration of the cellulose fibers is 5% by mass or more, to the removal of the concentrating agent.

[5] The thickener according to [3] above, wherein the production method further comprises a step of dipping the concentrating agent-containing concentrate liquid or dried product in which the solid concentration of the cellulose fibers is 5% by mass or more, in a liquid comprising an organic solvent

[6] The thickener according to [5] above, wherein the liquid comprising an organic solvent comprises an alkali or an acid.

[7] The thickener according to [1] or [2] above which is produced by a production method comprising a step of adding an organic solvent to the composition comprising ultrafine cellulose fibers in which the solid concentration of the cellulose fibers is less than 20% by mass, to adjust the solid concentration of the cellulose fibers to 20% by mass or more.

[8] The thickener according to [1] or [2] above which is produced by a production method comprising a step of evaporating water by the heating of the composition comprising ultrafine cellulose fibers in which the solid concentration of the cellulose fibers is less than 20% by mass, to adjust the solid concentration of the cellulose fibers to 20% by mass or more.

[9] The thickener according to any one of [1] to [8] above, wherein the substituent is an anion group.

[10] The thickener according to [9] above, wherein the substituent is introduced by esterification reaction.

[11] The thickener according to [9] or [10] above, wherein the substituent is a phosphoric acid group or a sulfone group.

[12] The thickener according to any one of [9] to [11] above, wherein the cellulose fibers are derived from wood.

[13] The thickener according to any one of [9] to [12] above, wherein the cellulose fibers have 5% by mass or more of a non-crystalline region.

[14] The thickener according to any one of [9] to [12] above, wherein the cellulose fibers have 10% by mass or more of a non-crystalline region.

[15] The thickener according to any one of [9] to [12] above, wherein the cellulose fibers have 20% by mass or more of a non-crystalline region.

[16] A re-dispersion of a thickener according to any one of [1] to [15] above, the re-dispersion being obtained by a production method comprising a step of mixing the thickener according to any one of [1] to [15] above with an aqueous solvent having a salt concentration of less than 1% by mass (preferably a salt concentration of less than 0.1% by mass, more preferably a salt concentration of less than 0.05% by mass, further preferably a salt concentration of less than 0.025% by mass) to obtain a re-dispersion in which the solid concentration of the cellulose fibers is less than 5% by mass, and adding a salt to the obtained re-dispersion to obtain a re-dispersion having a salt concentration of 0.1% by mass or more.

[17] A re-dispersion of a thickener according to any one of [1] to [15] above, the re-dispersion being obtained by a production method comprising a step of mixing the thickener according to any one of [1] to [15] above with an aqueous solvent having a salt concentration of less than 1% by mass (preferably a salt concentration of less than 0.5% by mass, preferably a salt concentration of less than 0.1% by mass, more preferably a salt concentration of less than 0.05% by mass, further preferably a salt concentration of less than 0.025% by mass) to obtain a re-dispersion in which the solid concentration of the cellulose fibers is less than 5% by mass, and adding a salt to the obtained re-dispersion to obtain a re-dispersion having a salt concentration of 0.5% by mass or more.

[18] A re-dispersion of a thickener according to any one of [1] to [15] above, the re-dispersion being obtained by a production method comprising a step of mixing the thickener according to any one of [1] to [15] above with an aqueous solvent having a salt concentration of less than 1% by mass (preferably a salt concentration of less than 0.5% by mass, preferably a salt concentration of less than 0.1% by mass, more preferably a salt concentration of less than 0.05% by mass, further preferably a salt concentration of less than 0.025% by mass) to obtain a re-dispersion in which the solid concentration of the cellulose fibers is less than 5% by mass, and adding a salt to the obtained re-dispersion to obtain a re-dispersion having a salt concentration of 1.0% by mass or more.

[19] The re-dispersion according to any one of [16] to [18] above which is a food product or a cosmetic.

The present invention further provides the following production method:

[1] A method for producing a dispersion of ultrafine cellulose fibers, comprising a steps of:

mixing a concentrate liquid or a dried product of a composition comprising ultrafine cellulose fibers with an aqueous solvent having a salt concentration of less than 1% by mass (preferably a salt concentration of less than 0.5% by mass, preferably a salt concentration of less than 0.1% by mass, more preferably a salt concentration of less than 0.05% by mass, further preferably a salt concentration of less than 0.025% by mass) to obtain dispersion 1 of the ultrafine cellulose fibers in which the solid concentration of the cellulose fibers is less than 5% by mass; and adding a salt to the obtained dispersion 1 to obtain dispersion 2 having a salt concentration of 0.1% by mass or more.

[2] The production method according to [1] above, wherein the step of obtaining dispersion 2 comprises adding a salt to the obtained dispersion 1 to obtain dispersion 2 having a salt concentration of 0.5% by mass or more.

[3] The production method according to [1] above, wherein the step of obtaining dispersion 2 comprises adding a salt to the obtained dispersion 1 to obtain dispersion 2 having a salt concentration of 1.0% by mass or more.

[4] The production method according to any one of [1] to [3] above, wherein in the concentrate liquid or the dried product of a composition comprising ultrafine cellulose fibers, the solid concentration of the cellulose fibers is 5% by mass or more and 100% by mass or smaller.

[5] The production method according to any one of [1] to [4] above, wherein the pH of the dispersion 1 (or re-dispersion 2) is adjusted to 7 to 14 when the ultrafine cellulose fibers have no or negative surface charge, and the pH of the dispersion 1 (or re-dispersion 2) is adjusted to the range of 2 to 7 when the ultrafine cellulose fibers have positive surface charge.

[6] A method for producing a concentrate liquid or a dried product of a composition comprising ultrafine cellulose fibers having 0.14 to 2.5 mmol/g of a substituent, comprising the following step:
adding a concentrating agent selected from the group consisting of a salt of a polyvalent metal, a cationic surfactant, and a cationic polymer coagulant to the composition comprising ultrafine cellulose fibers (preferably a composition comprising ultrafine cellulose fibers in which the solid concentration of the cellulose fibers is less than 5% by mass) to adjust the solid concentration of the cellulose fibers to 5% by mass or more.

[7] The production method according to [6] above, further comprising a step of dipping the concentrating agent-containing concentrate liquid or dried product in which the solid concentration of the cellulose fibers is 5% by mass or more, in an acidic liquid to remove the concentrating agent

[8] The production method according to [6] above, further comprising a step of dipping the concentrating agent-containing concentrate liquid or dried product in which the solid concentration of the cellulose fibers is 5% by mass or more, in a liquid comprising an organic solvent.

[9] The production method according to [8] above, wherein the liquid comprising an organic solvent comprises an alkali or an acid.

[10] The production method according to any one of [1] to [9] above, wherein the production method comprises a step of adding an organic solvent to the composition comprising ultrafine cellulose fibers in which the solid concentration of the cellulose fibers is less than 20% by mass, to adjust the solid concentration of the cellulose fibers to 20% by mass or more.

[11] The production method according to any one of [1] to [9] above, wherein the production method comprises a step of evaporating water by the heating of the composition comprising ultrafine cellulose fibers in which the solid concentration of the cellulose fibers is less than 20% by mass, to adjust the solid concentration of the cellulose fibers to 20% by mass or more.

[12] The production method according to any one of [1] to [11] above, wherein the ultrafine cellulose fibers have 0.14 to 2.5 mmol/g of a substituent.

[13] The production method according to [12] above, wherein the substituent is an anion group.

[14] The production method according to [13] above, wherein the substituent is introduced by esterification reaction.

[15] The production method according to [12] or [13] above, wherein the substituent in the ultrafine cellulose fibers is a phosphoric acid group or a sulfone group.

[16] The production method according to any one of [12] to [15] above, wherein the cellulose fibers are derived from wood.

[17] The production method according to any one of [12] to [16] above, wherein the cellulose fibers have 5% or more of a non-crystalline region.

[18] The production method according to any one of [12] to [16] above, wherein the cellulose fibers have 10% or more of a non-crystalline region.

[19] The production method according to any one of [12] to [16] above, wherein the cellulose fibers have 20% or more of a non-crystalline region.

The present invention further provides the following:

[1] A subterranean formation processing composition comprising ultrafine cellulose fibers having 0.14 to 2.5 mmol/g of a substituent

[2] The composition according to [1] above, wherein the substituent is an anion group.

[3] The composition according to [1] or [2] above, wherein the substituent is introduced by esterification reaction.

[4] The composition according to any one of [1] to [3] above, wherein the substituent is a phosphoric acid group or a sulfone group.

[5] The composition according to any one of [1] to [4] above, wherein the viscosity at a temperature of 30° C. to 80° C. is 60% or more with respect to the viscosity at 25° C. when the composition is dispersed in water such that the solid concentration of the cellulose fibers is 0.2 to 0.4% by mass.

[6] The composition according to any one of [1] to [5] above, wherein the composition has a water stopping property.

[7] The composition according to any one of [1] to [6] above for use in the addition to a subterranean formation processing fluid.

[8] The composition according to any one of [1] to [7] above for use in the addition to mud water, a fracturing fluid, a cementing fluid, a well control fluid, a well kill fluid, an acid fracturing fluid, an acid diverting fluid, a stimulation fluid, a sand control fluid, a completion fluid, a wellbore consolidation fluid, a remediation treatment fluid, a spacer fluid, a drilling fluid, a frac-packing fluid, a water conformance fluid, or a gravel packing fluid.

[9] The composition according to any one of [1] to [8] above which is in the form of a concentrate liquid or a dried product.

[10] A subterranean formation processing fluid comprising a composition according to any one of [1] to [9] above, wherein the solid concentration of the cellulose fibers is 0.05 to 2% by mass.

[11] A subterranean formation processing fluid comprising a composition according to any one of [1] to [9] above and any member selected from the group consisting of a weighting material, a viscosity adjuster, a dispersant, a coagulant, a lost circulation preventing agent, a pH adjuster, a friction reducer, a hygroscopic expansion controlling agent, an emulsifier, a surfactant, a biocide, an antifoaming agent, a scale preventive, a corrosion inhibitor, a temperature stabilizer, a resin coating agent, a crack support material, a salt, and a proppant.

[12] The fluid according to [10] or [11] above which is a fracturing fluid, mud water, or a cementing fluid.

[13] A method for producing a subterranean formation processing fluid according to any one of [10] to [12] above, comprising a step of adding a salt to a composition which is a dispersion having an ultrafine cellulose fiber concentration of less than 20% by mass to prepare a fluid having a salt concentration of 1% by mass or more.

[14] A method for processing a subterranean formation, comprising using a composition according to any one of [1] to [9] above or a fluid according to any one of [10] to [12] above.

[15] A method for producing a petroleum resource, comprising using a composition according to any one of [1] to [9] above or a fluid according to any one of [10] to [12] above.

[16] A method for producing a subterranean formation processing fluid according to any one of [10] to [12] above, comprising a step of mixing a concentrate liquid or a dried product of a dispersion of the ultrafine cellulose fibers with an aqueous solvent so that the ultrafine cellulose fibers are re-dispersed to obtain a fluid.

[17] The production method according to [16] above, further comprising a step of preparing the concentrate liquid or the dried product using a concentrating agent and/or a dryer.

[18] The production method according to [16] or [17] above, wherein the solid concentration of the cellulose fibers contained in the concentrate liquid or the dried product is 20% by mass or more.

[19] The production method according to any one of [16] to [18] above, wherein the concentrating agent is any one or more agents selected from the group consisting of an acid, an alkali, a salt of a polyvalent metal, a cationic surfactant, an anionic surfactant, a cationic polymer coagulant, an anionic polymer coagulant, and an organic solvent

[20] The production method according to [16] above, wherein the pH of the fluid is adjusted to 7 to 14 when the cellulose fibers have no or negative surface charge, and the pH of the fluid is adjusted to the range of 2 to 7 when the cellulose fibers have positive surface charge.

[21] The production method according to any one of [16] to [20] above, wherein the production method comprises re-dispersing the concentrate liquid or the dried product of a dispersion of the ultrafine cellulose fibers by mixing with an aqueous solvent which is salt water having a salt concentration of less than 1% by mass such that the ultrafine cellulose fibers become less than 20% by mass, and then adding a salt to the re-dispersion to obtain a fluid having a salt concentration of 1% by mass or more.

The present invention further provides the following:

[1] A subterranean formation processing composition comprising ultrafine cellulose fibers having 0.14 to 2.5 mmol/g of a substituent.

[2] The composition according to [1] above, wherein the substituent is an anion group.

[3] The composition according to [1] or [2] above, wherein the substituent is a phosphoric acid group.

[4] The composition according to any one of [1] to [3] above, wherein the viscosity at a temperature of 30° C. to 80° C. is 60% or more with respect to the viscosity at 25° C. when the composition is dispersed in water such that the solid concentration of the cellulose fibers is 0.2 to 0.4% by mass.

[5] The composition according to any one of [1] to [4] above, wherein the composition has a water stopping property.

[6] The composition according to any one of [1] to [5] above for use in the addition to a subterranean formation processing fluid.

[7] The composition according to any one of [1] to [6] above for use in the addition to mud water, a fracturing fluid, a cementing fluid, a well control fluid, a well kill fluid, an acid fracturing fluid, an acid diverting fluid, a stimulation fluid, a sand control fluid, a completion fluid, a wellbore consolidation fluid, a remediation treatment fluid, a spacer fluid, a drilling fluid, a frac-packing fluid, a water conformance fluid, or a gravel packing fluid.

[8] A subterranean formation processing fluid comprising a composition according to any one of [1] to [7] above, wherein the solid concentration of the cellulose fibers is 0.05 to 2% by mass.

[9] A subterranean formation processing fluid comprising a composition according to any one of [1] to [7] above and any member selected from the group consisting of a weighting material, a viscosity adjuster, a dispersant, a coagulant, a lost circulation preventing agent, a pH adjuster, a friction reducer, a hygroscopic expansion controlling agent, an emulsifier, a surfactant, a biocide, an antifoaming agent, a scale preventive, a corrosion inhibitor, a temperature stabilizer, a resin coating agent, a crack support material, a salt, and a proppant.

[10] The fluid according to [8] or [9] above which is a fracturing fluid, mud water, or a cementing fluid.

[11] A method for processing a subterranean formation, comprising using a composition according to any one of [1] to [7] above or a fluid according to any one of [8] to [10] above.

[12] A method for producing a petroleum resource, comprising using a composition according to any one of [1] to [7] above or a fluid according to any one of [8] to [10] above.

[13] A method for producing a composition according to any one of [1] to [7] above, comprising a step of concentrating or drying a dispersion of the ultrafine cellulose fibers and re-dispersing the obtained concentrate liquid or dried product in an aqueous solvent to obtain a re-dispersion.

[14] The production method according to [13] above, wherein the concentration is carried out using a concentrating agent and/or a dryer.

[15] The production method according to [13] or [14] above, wherein the solid concentration of the cellulose fibers contained in the concentrate liquid or the dried product is 20% by mass or more.

[16] The production method according to any one of [13] to [15] above, wherein the concentrating agent is any one or more agents selected from the group consisting of an acid, an alkali, a salt of a polyvalent metal, a cationic surfactant, an anionic surfactant, a cationic polymer coagulant, and an anionic polymer coagulant

[17] The production method according to [13] above, wherein in the re-dispersion step, the pH of the re-dispersion is adjusted to 7 to 14 when the cellulose fibers have no or negative surface charge, and the pH of the re-dispersion is adjusted to the range of 2 to 7 when the cellulose fibers have positive surface charge.

Advantageous Effects of Invention

One aspect of the present invention provides a subterranean formation processing composition that has a stable viscosity against change in temperature and a high water stopping property. One aspect of the present invention also provides a composition comprising ultrafine cellulose fibers that has a stable viscosity against change in temperature. One aspect of the present invention further provides a method capable of efficiently concentrating or drying a cellulose dispersion even in an aqueous solution containing a salt, and further re-dispersing the concentrate liquid or the dried product, and such a concentrate liquid or a dried product.

A dispersion after re-dispersion of the subterranean formation processing composition in a concentrated or dried form has a sufficiently high viscosity and high viscosity stability against change in temperature from the viewpoint of easiness of transport and use.

One aspect of the present invention further provides a method for allowing ultrafine cellulose fibers in a concentrated or dried form to exert high viscosity in a solution containing a salt.

BRIEF DESCRIPTION OF DRAWING

FIG. 1 shows 3 regions in the measurement of the amount of a substituent by a conductometric titration method.

EMBODIMENTS FOR CARRYING OUT THE INVENTION

Hereinafter, the present invention will be described in more detail. Materials, methods, and numeric ranges, etc., described in the present specification, are given for illustrating embodiments of the present invention and are not intended to limit the scope of the invention. Furthermore, use of the other materials, methods, and numeric values, etc., is not excluded.

The range "X to Y" includes both of the values X and Y. The term "%" represents a percentage based on mass unless otherwise specified.

[Composition Comprising Ultrafine Cellulose Fibers]

In the present invention, ultrafine cellulose fibers having a substituent such as a phosphoric acid group, which are obtained by the chemical treatment and defibration treatment of a cellulose raw material, can be used.

<Ultrafine Cellulose Fibers>

Examples of the cellulose raw material include, but are not particularly limited to: papermaking pulp; cotton-based pulp such as cotton linter and cotton lint; non-wood-based pulp such as linen, straw, and bagasse; and cellulose isolated from sea squirt, seaweed, or the like. Among them, papermaking pulp is preferred from the viewpoint of easy availability, though the cellulose raw material is not limited thereto. Examples of the papermaking pulp include hardwood kraft pulp (leaf bleached kraft pulp (LBKP), leaf unbleached kraft pulp (LUKP), leaf oxygen-bleached kraft pulp (LOKP), etc.), and softwood kraft pulp (needle bleached kraft pulp (NBKP), needle unbleached kraft pulp (NUKP), needle oxygen-bleached kraft pulp (NOKP), etc.). Further examples thereof include, but are not particularly limited to: chemical pulp such as sulfite pulp (SP) and alkaline pulp (AP); semichemical pulp such as semichemical pulp (SCP) and chemiground wood pulp (CGP); mechanical pulp such as ground pulp (GP) and thermomechanical pulp (TMP and BCTMP); non-wood pulp prepared from a raw material such as *Broussonetia papyrifera*, *Edgeworthia chrysantha*, linen, or kenaf; and deinking pulp prepared using used paper as a raw material. Among them, kraft pulp, deinking pulp, or sulfite pulp is preferred because of easier availability, though the cellulose raw material is not particularly limited thereto. One of these cellulose raw materials may be used alone, or two or more thereof may be used as a mixture.

In the present invention, the term "cellulose fibers" includes coarse cellulose fibers and ultrafine cellulose fibers unless otherwise specified.

The average fiber width of the coarse cellulose fibers (also simply referred to as the coarse fibers) is, for example, 1 μm or more, preferably 5 μm or more, more preferably 10 μm or more, observed under an electron microscope.

The average fiber width of the ultrafine cellulose fibers (also simply referred to as the ultrafine fibers) is not particularly limited and is preferably 2 to 1000 nm, more preferably 2 to 100 nm, more preferably 2 to 50 nm, further preferably 2 nm or more and less than 10 nm, observed under an electron microscope. If the average fiber width of the ultrafine cellulose fibers is less than 2 nm, the resulting ultrafine cellulose fibers are dissolved as cellulose molecules in water and therefore no longer exert their physical properties (strength, rigidity, and dimensional stability). In this context, the type I crystal structure assumed by the ultrafine cellulose fibers can be identified in a diffraction profile obtained by wide-angle x-ray diffraction photography using CuKα(λ=1.5418 angstroms) monochromatized with graphite. Specifically, this structure can be identified from its typical peaks at two positions of 2θ=approximately 14 to 17° and 2θ=approximately 22 to 23° C.

The proportion of the type I crystal structure in the cellulose fibers is desirably 30% by mass or more, more preferably 50% by mass or more, further preferably 70% by mass or more. Unlike cellulose nanocrystals described in Patent Literatures 2 and 3, which are produced by destroying a non-crystalline region, the ultrafine cellulose fibers also have a non-crystalline region.

The ultrafine cellulose fibers of the present invention have 5% by mass or more of the non-crystalline region. The ultrafine cellulose fibers preferably have 10% by mass or more, more preferably 20% by mass or more, of the non-crystalline region.

The proportion of the type I crystal structure in the cellulose fibers is also referred to as a cellulose type I crystallization index (%) which can be calculated on the basis of a measurement value in an X-ray diffraction apparatus according to the following expression (1):

[Expression 1]

$$\text{Cellulose type } I \text{ crystallization index (\%)} = [(I_{22.6} - I_{18.5})/I_{22.6}] \times 100 \quad (1)$$

In the expression, $I_{22.6}$ represents the diffraction intensity of a lattice plane (002 plane) (diffraction angle 2θ=22.6°) in X-ray diffraction, and $I_{18.5}$ represents the diffraction intensity of an amorphous moiety (diffraction angle 2θ=18.5°).

The fiber widths of the cellulose fibers are measured by observation under an electron microscope as follows: an aqueous suspension containing the cellulose fibers having a concentration of 0.05 to 0.1% by mass is prepared, and the suspension is casted onto a hydrophilized carbon film-coated grid to prepare a sample for TEM observation. If the sample contains wide fibers, SEM images of the surface of the suspension casted onto glass may be observed. The sample is observed using electron microscope images taken at a magnification of 1000×, 5000×, 10000×, or 50000× according to the widths of the constituent fibers. However, the sample, the observation conditions, and the magnification are adjusted so as to satisfy the following conditions:

(1) one straight line X is drawn at an arbitrary site in an observation image, and 20 or more fibers intersect the straight line X; and
(2) a straight line Y vertically intersecting the straight line in the same image is drawn, and 20 or more fibers intersect the straight line Y.

The widths of the fibers interlocking the straight line X and the straight line Y are visually read for observation images that satisfy the conditions described above. In this way, 3 or more images of at least surface portions that do not overlap with each other are observed, and the widths of the fibers interlocking the straight line X and the straight line Y is read for each of the images. In this way, the fiber widths of at least 20 fibers×2×3=120 fibers are read. The average fiber width (also simply referred to as the "fiber width") of the cellulose fibers is the average value of the fiber widths thus read.

The fiber length of the ultrafine cellulose fibers is not particularly limited and is preferably 0.1 to 1000 μm, more preferably 0.5 to 800 μm, particularly preferably 1 to 600 μm. If the fiber length is less than 0.1 μm, it is difficult to form an ultrafine fiber sheet. If the fiber length exceeds 1000 μm, slurry of the resulting ultrafine fibers has a very high viscosity and thus becomes less handleable. The fiber length can be determined by image analysis using TEM, SEM, or AFM.

<Chemical Treatment>
[General Chemical Treatment]

The chemical treatment method for the cellulose raw material is not particularly limited as long as the method can yield the ultrafine fibers. Examples thereof include, but are not limited to, acid treatment, ozone treatment, TEMPO oxidation treatment, enzyme treatment, and treatment with a compound capable of forming a covalent bond with a functional group in the cellulose or fiber raw material.

One example of the acid treatment can include, but are not particularly limited to, a method described in Otto van den Berg; Jeffrey R. Capadona; Christoph Weder; Biomacromolecules 2007, 8, 1353-1357. Specifically, the cellulose fibers are subjected to hydrolysis treatment with sulfuric acid, hydrochloric acid, or the like.

One example of the ozone treatment can include, but are not particularly limited to, a method described in JP Patent Publication (Kokai) No. 2010-254726 A (2010). Specifically, the fibers are subjected to the ozone treatment and then dispersed in water, followed by the crushing treatment of the obtained aqueous dispersion of the fibers.

One example of the TEMPO oxidation can include, but are not particularly limited to, a method described in Saito T & al. Homogeneous suspensions of individualized microfibrils from TEMPO-catalyzed oxidation of native cellulose. Biomacromolecules 2006, 7 (6), 1687-91. Specifically, the fibers are subjected to the IEMPO oxidation treatment and then dispersed in water, followed by the crushing treatment of the obtained aqueous dispersion of the fibers.

One example of the enzyme treatment can include, but are not particularly limited to, a method described in Japanese Patent Application No. 2012-115411 (the contents described in Japanese Patent Application No. 2012-115411 are incorporated herein by reference in its entirety). Specifically, this method involves treating the fiber raw material with an enzyme at least under a condition where the ratio between the EG activity and the CBHI activity of the enzyme is 0.06 or more.

The EG activity is measured and defined as described below.

A substrate solution (concentration: 100 mM, containing an acetic acid-sodium acetate buffer solution of pH 5.0) of carboxymethylcellulose having a concentration of 1% (W/V) (CMCNa High viscosity; Cat No. 150561, MP Biomedicals, Inc.) is prepared. An enzyme for assay is diluted (any dilution ratio at which the absorbance of an enzyme solution given below can apply to a calibration curve obtained from glucose standard solutions given below) with a buffer solution (same as above) in advance. To 90 μl of the substrate solution, 10 μl of the enzyme solution obtained by the dilution is added and reacted therewith at 37° C. for 30 minutes.

In order to prepare a calibration curve, ion-exchange water (blank) and glucose standard solutions (concentration: at least 4 standard solutions differing in concentration from 0.5 to 5.6 mM) are selected, and 100 μl each thereof is prepared and incubated at 37° C. for 30 minutes.

After the reaction, 300 μl of a DNS coloring solution (1.6% by mass of NaOH, 1% by mass of 3,5-dinitrosalicylic acid, and 30% by mass of potassium sodium tartrate) is added to each of the enzyme-containing solution, the blank for a calibration curve, and the glucose standard solutions, and the mixture is boiled for 5 minutes to develop color. Immediately after the color development, the reaction solution is cooled in ice, and 2 ml of ion-exchange water is added thereto, followed by well mixing. The mixture is left standing for 30 minutes, and the absorbance is measured within 1 hour thereafter.

For the absorbance measurement, 200 μl of the reaction solution is added to each well of a 96-well microwell plate (e.g., 269620, manufactured by Nalge Nunc International), and the absorbance at 540 nm can be measured using a microplate reader (e.g., Infinite M200, manufactured by Tecan Trading AG).

A calibration curve is prepared using the absorbance of each glucose standard solution from which the absorbance of the blank has been subtracted, and the glucose concentration. The amount of reducing sugar formed corresponding to glucose in the enzyme solution is calculated by subtracting the absorbance of the blank from the absorbance of the enzyme solution and then using the calibration curve (when the absorbance of the enzyme solution does not apply to the calibration curve, the dilution ratio for diluting the enzyme with the buffer solution as described above is changed, followed by re-measurement). The amount of the enzyme that forms 1 μmole of glucose-equivalent reducing sugar for 1 minute is defined as 1 unit. The EG activity can be determined according to the following expression:

EG activity=Amount of reducing sugar formed corresponding to glucose (μmole) in 1 ml of the enzyme solution obtained by dilution with the buffer solution/30 min×Dilution ratio

[see Sakuzo Fukui, "Experimental Methods of Biochemistry (Quantitative Determination of Reducing Sugar) 2nd edition", Gakkai Shuppan Center Co., Ltd., p. 23 to 24 (1990)].

The CBHI activity is measured and defined as described below.

32 μl of 1.25 mM 4-methylumbelliferyl-cellobioside (concentration: 125 mM, dissolved in an acetate-sodium acetate buffer solution of pH 5.0) is added to each well of a 96-well microwell plate (e.g., 269620, manufactured by Nalge Nunc International). 4 μl of 100 mM glucono-1,5-lactone is added to each well. Further, 4 μl of a solution containing an enzyme for assay diluted (any dilution ratio at which the fluorescence intensity of an enzyme solution given below can apply to a calibration curve obtained from standard solutions given below) with the same buffer solution as above is added to each well and reacted therewith at 37° C. for 30 minutes. Then, the reaction is terminated by the addition of a 500 mM glycine-NaOH buffer solution (pH 10.5) at 200 µl/well.

40 µl each of 4-methyl-umbelliferon standard solutions (concentration: at least 4 standard solutions differing in concentration from 0 to 50 µM) is added as a standard solution for a calibration curve to each well of the same 96-well microwell plate as above and warmed at 37° C. for 30 minutes. Then, 200 µl of a 500 mM glycine-NaOH buffer solution (pH 10.5) is added to each well.

The fluorescence intensity at 350 nm (excitation light: 460 nm) is measured using a microplate reader (e.g., Fluoroskan Ascent FL, manufactured by Thermo Labsystems Inc.). The amount of 4-methyl-umbelliferon formed in the enzyme solution is calculated using the calibration curve prepared from the data on the standard solutions (when the fluorescence intensity of the enzyme solution does not apply to the calibration curve, the dilution ratio is changed, followed by re-measurement). The amount of the enzyme that forms 1 µmole of 4-methyl-umbelliferon for 1 minute is defined as 1 unit. The CBHI activity can be determined according to the following expression:

CBHI activity=Amount of 4-methyl-umbelliferon formed (µmole) in 1 ml of the diluted enzyme solution/30 min×Dilution ratio.

Examples of the treatment with a compound capable of forming a covalent bond with a functional group in the cellulose or fiber raw material can include, but are not particularly limited to, the following methods:

treatment with a compound having a quaternary ammonium group described in JP Patent Publication (Kokai) No. 2011-162608 A (2011);

a method using a carboxylic acid compound described in JP Patent Publication (Kokai) No. 2013-136859 A (2013);

a method using "at least one compound selected from an oxo acid and polyoxo acid containing a phosphorus atom in their structures, and salts thereof" described in International Publication No. WO2013/073652 (PCT/JP2012/079743); and a method using carboxymethylation reaction described in JP Patent Publication (Kokai) No. 2013-185122 A (2013).

The treatment with a compound having a quaternary ammonium group described in JP Patent Publication (Kokai) No. 2011-162608 A (2011) is a method of reacting hydroxy groups in fibers with a cationizing agent having a quaternary ammonium group to cationically modify the fibers.

The method described in JP Patent Publication (Kokai) No. 2013-136859 A (2013) employs at least one carboxylic acid compound selected from the group consisting of a compound having two or more carboxy groups, an acid anhydride of the compound having two or more carboxy groups, and their derivatives. This method comprises a carboxy group introduction step of introducing the carboxy groups into a fiber raw material by the treatment of the fiber raw material with the selected compound, and an alkali treatment step of treating the carboxy group-introduced fiber raw material with an alkali solution after the completion of the carboxy group introduction step.

International Publication No. WO2013/073652 (PCT/JP2012/079743) describes a method comprising treating a fiber raw material with at least one compound selected from oxo acid and polyoxo acid containing a phosphorus atom in their structures, and salts thereof (compound A). Specific examples thereof include a method of mixing the fiber raw material with a powder or an aqueous solution of compound A, and a method of adding an aqueous solution of compound A to slurry of the fiber raw material. Examples of the compound A include, but are not particularly limited to, phosphoric acid, polyphosphoric acid, phosphorous acid, phosphoric acid, polyphosphonic acid, and their esters. The compound A may be in the form of a salt. Examples of the compound having a phosphoric acid group include, but are not particularly limited to: phosphoric acid; sodium dihydrogen phosphate, disodium hydrogen phosphate, trisodium phosphate, sodium pyrophosphate, and sodium metaphosphate, which are sodium salts of phosphoric acid; potassium dihydrogen phosphate, dipotassium hydrogen phosphate, tripotassium phosphate, potassium pyrophosphate, and potassium metaphosphate, which are potassium salts of phosphoric acid; and ammonium dihydrogen phosphate, diammonium hydrogen phosphate, triammonium phosphate, ammonium pyrophosphate, and ammonium metaphosphate, which are ammonium salts of phosphoric acid.

JP Patent Publication (Kokai) No. 2011-185122 A (2011) describes a method for producing cellulose nanofibers, comprising treating, in a high-pressure homogenizer, anionically modified cellulose in which the degree of substitution by carboxymethyl is 0.02 to 0.50 per glucose unit. In this context, the anionic modification can be carried out, for example, by mercerization treatment using cellulose as a raw material and alkali metal hydroxide as a mercerizing agent at 0.5 to 20 times the mol of the glucose residues in the raw material, and subsequent etherification reaction using a carboxymethylating agent added at 0.05 to 10.0 times the mol of the glucose residues.

In the present invention, a substituent is added to the ultrafine cellulose fibers. Examples of the substituent include, but are not particularly limited to, an anion group and a cation group. The anion group is preferably a phosphoric acid group, a sulfone group, or a carboxyl group. Particularly, a phosphoric acid group or a sulfone group introduced by esterification reaction is more preferred, and a phosphoric acid group introduced by esterification reaction is particularly preferred.

[Phosphoric Acid Esterification]

In a particularly preferred aspect of the present invention, the ultrafine cellulose fibers have an anionic group. In a more preferred aspect, the ultrafine cellulose fibers have been phosphoric acid esterified (also simply referred to as phosphorylated).

(Phosphoric Acid Group Introduction Step)

A method for producing the phosphoric acid esterified ultrafine cellulose fibers of the present embodiment comprises a phosphoric acid group introduction step. The phosphoric acid group introduction step is a step of allowing a compound having a phosphoric acid group or/and a salt thereof (hereinafter, referred to as "compound A") to act on the fiber raw material including cellulose in the presence of urea or/and a derivative thereof (hereinafter, referred to as "compound B"). As a result, the phosphoric acid group is introduced to a hydroxy group in the cellulose fibers.

The phosphoric acid group introduction step inevitably comprises a step of introducing a phosphoric acid group to cellulose and may comprise, if desired, an alkali treatment step mentioned later, a step of washing off redundant reagents, etc.

One example of the method for allowing compound A to act on the fiber raw material in the presence of compound B includes a method of mixing the fiber raw material in a dry or wet state with a powder or an aqueous solution of compound A and compound B. Another example thereof includes a method of adding a powder or an aqueous solution of compound A and compound B to slurry of the fiber raw material. Among them, a method of adding an aqueous solution of compound A and compound B to the fiber raw material in a dry state, or a method of adding a powder or an aqueous solution of compound A and compound B to the fiber raw material in a wet state is preferred because of the high homogeneity of the reaction, though the method is not particularly limited thereto. Compound A and compound B may be added at the same time or may be added separately. Alternatively, compound A and compound B to be subjected to the reaction may be first added as an aqueous solution, which is then compressed to squeeze out redundant chemicals. The form of the fiber raw material is preferably a cotton-like or thin sheet form, though the form is not particularly limited thereto.

The compound A used in the present embodiment is a compound having a phosphoric acid group or/and a salt thereof.

Examples of the compound having a phosphoric acid group include, but are not particularly limited to, phosphoric acid, lithium salts of phosphoric acid, sodium salts of phosphoric acid, potassium salts of phosphoric acid, and ammonium salts of phosphoric acid. Examples of the lithium salts of phosphoric acid include lithium dihydrogen phosphate, dilithium hydrogen phosphate, trilithium phosphate, lithium pyrophosphate, and lithium polyphosphate. Examples of the sodium salts of phosphoric acid include sodium dihydrogen phosphate, disodium hydrogen phosphate, trisodium phosphate, sodium pyrophosphate, and sodium polyphosphate. Examples of the potassium salts of phosphoric acid include potassium dihydrogen phosphate, dipotassium hydrogen phosphate, tripotassium phosphate, potassium pyrophosphate, and potassium polyphosphate. Examples of the ammonium salts of phosphoric acid include ammonium dihydrogen phosphate, diammonium hydrogen phosphate, triammonium phosphate, ammonium pyrophosphate, and ammonium polyphosphate.

Among them, phosphoric acid, a sodium salt of phosphoric acid, a potassium salt of phosphoric acid, or an ammonium salt of phosphoric acid is preferred from the viewpoint of the high efficiency of phosphoric acid group introduction, higher improvement in defibration efficiency in a defibration step described below, low cost, and industrial applicability. Sodium dihydrogen phosphate or disodium hydrogen phosphate is more preferred, though the compound A is not particularly limited thereto.

The compound A is preferably used as an aqueous solution because of the enhanced homogeneity of the reaction and the increased efficiency of phosphoric acid group introduction, though the form is not particularly limited thereto. The pH of the aqueous solution of the compound A is not particularly limited and is preferably 7 or lower because of the increased efficiency of phosphoric acid group introduction, more preferably 3 to 7 from the viewpoint of suppressing the hydrolysis of pulp fibers. The pH may be adjusted, for example, by using an acidic compound having a phosphoric acid group and an alkaline compound having a phosphoric acid group in combination and changing the ratio between their amounts. Alternatively, the pH may be adjusted, for example, by adding an inorganic alkali or an organic alkali to an acidic compound having a phosphoric acid group.

The amount of the compound A added to the fiber raw material is not particularly limited. When the amount of the compound A added is converted to the amount of a phosphorus atom, the amount of the phosphorus atom added to the fiber raw material is preferably 0.5 to 100% by mass, more preferably 1 to 50% by mass, most preferably 2 to 30% by mass. When the amount of the phosphorus atom added to the fiber raw material falls within the range of 0.5 to 100% by mass, the yield of the ultrafine cellulose fibers can be further improved. If the amount of the phosphorus atom added to the fiber raw material exceeds 100% by mass, this is not preferred because the effect of improving the yield levels off and cost of the compound A used is elevated. On the other hand, if the amount of the phosphorus atom added to the fiber raw material is lower than 0.5% by mass, this is not preferred because an adequate yield cannot be obtained.

Examples of the compound B used in the present embodiment include, but are not particularly limited to, urea, thiourea, biuret, phenyl urea, benzyl urea, dimethyl urea, diethyl urea, tetramethyl urea, benzoylene urea, and hydantoin. Among them, urea is preferred because urea requires low cost, is easily handled, and easily forms a hydrogen bond with the fiber raw material having a hydroxyl group.

The compound B, as with the compound A, is preferably used as an aqueous solution, though the form is not particularly limited thereto.

An aqueous solution containing both of the compound A and the compound B dissolved therein is preferably used because of the enhanced homogeneity of the reaction, though the form is not particularly limited thereto.

The amount of the compound B added to the fiber raw material is not particularly limited and is preferably 1 to 300% by mass.

The reaction system may contain an amide or an amine in addition to the compound A and the compound B. Examples of the amide include formamide, dimethylformamide, acetamide, and dimethylacetamide. Examples of the amine include methylamine, ethylamine, trimethylamine, triethylamine, monoethanolamine, diethanolamine, triethanolamine, pyridine, ethylenediamine, and hexamethylenediamine. Among them, particularly, triethylamine is known to work as a favorable reaction catalyst.

(Alkali Treatment)

In the case of producing the phosphorylated ultrafine fibers, alkali treatment can be performed between the phosphoric acid group introduction step and a defibration treatment step mentioned later. Examples of the alkali treatment method include, but are not particularly limited to, a method of dipping the phosphoric acid group-introduced fibers in an alkali solution.

The alkali compound contained in the alkali solution is not particularly limited and may be an inorganic alkali compound or may be an organic alkali compound. The solvent in the alkali solution may be water or an organic solvent and is not particularly limited. The solvent is preferably a polar solvent (water or a polar organic solvent such as an alcohol), more preferably an aqueous solvent containing at least water.

Among these alkali solutions, an aqueous sodium hydroxide solution or an aqueous potassium hydroxide solution is particularly preferred because of high versatility, though the alkali solution is not particularly limited thereto.

The temperature of the alkali solution in the alkali treatment step is not particularly limited and is preferably 5 to 80° C., more preferably 10 to 60° C.

The dipping time in the alkali solution in the alkali treatment step is not particularly limited and is preferably 5 to 30 minutes, more preferably 10 to 20 minutes.

The amount of the alkali solution used in the alkali treatment is not particularly limited and is preferably 100 to 100000% by mass, more preferably 1000 to 10000% by mass, with respect to the absolute dry mass of the phosphoric acid-introduced fibers.

In order to decrease the amount of the alkali solution used in the alkali treatment step, the phosphoric acid group-introduced fibers may be washed with water or an organic solvent before the alkali treatment step. After the alkali treatment, it is preferred for improving handleability to wash the alkali-treated phosphoric acid group-introduced fibers with water or an organic solvent before the defibration treatment step, though the method is not particularly limited thereto.

<Defibration Treatment>

The fibers obtained as described above can be subjected to defibration treatment in a defibration treatment step. In the defibration treatment step, the fibers are usually defibrated using a defibration treatment apparatus to obtain slurry containing ultrafine fibers. The treatment apparatus and the treatment method are not particularly limited.

A high-speed defibrator, a grinder (stone mill-type crusher), a high-pressure homogenizer, an ultrahigh-pressure homogenizer, a high-pressure collision-type crusher, a ball mill, a bead mill, or the like can be used as the defibration treatment apparatus. Alternatively, for example, a wet milling apparatus such as a disc-type refiner, a conical refiner, a twin-screw kneader, an oscillation mill, a homo-mixer under high-speed rotation, an ultrasonic disperser, or a beater may be used as the defibration treatment apparatus. The defibration treatment apparatus is not limited to those described above.

Preferred examples of the defibration treatment method include, but are not particularly limited to, a high-speed defibrator, a high-pressure homogenizer, and an ultrahigh-pressure homogenizer which are less influenced by milling media and have a small risk of contamination.

For the defibration treatment, the fiber raw material is preferably diluted into slurry using water and an organic solvent each alone or in combination, though the method is not particularly limited thereto. Water as well as a polar organic solvent can be used as a dispersion medium. Preferred examples of the polar organic solvent include, but are not particularly limited to, alcohols, ketones, ethers, dimethyl sulfoxide (DMSO), dimethylformamide (DMF), and dimethylacetamide (DMAc). Examples of the alcohols include methanol, ethanol, n-propanol, isopropanol, n-butanol, and t-butyl alcohol. Examples of the ketones include acetone and methyl ethyl ketone (MEK). Examples of the ethers include diethyl ether and tetrahydrofuran (THF). One of these dispersion media may be used, or two or more thereof may be used. The dispersion medium may also contain a solid content other than the fiber raw material, for example, urea having hydrogen-binding property.

The amount of the substituent introduced is not particularly limited and is 0.1 to 3.0 mmol/g, preferably 0.14 to 2.5 mmol/g, more preferably 0.2 to 2.0 mmol/g, with respect to 1 g (mass) of the ultrafine cellulose fibers. If the amount of the substituent introduced is less than 0.1 mmol/g, the ultrafine fiber formation from the fiber raw material is difficult. The resulting ultrafine cellulose fibers have poor stability. If the amount of the substituent introduced exceeds 2.0 mmol/g, an adequate viscosity cannot be obtained.

<Amount of Phosphoric Acid Group Introduced>

The amount of the phosphoric acid group introduced is not particularly limited and is 0.1 to 3.0 mmol/g, preferably 0.14 to 2.5 mmol/g, more preferably 0.2 to 2.0 mmol/g, with respect to 1 g (mass) of the ultrafine cellulose fibers. If the amount of the phosphoric acid group introduced is less than 0.1 mmol/g, the ultrafine fiber formation from the fiber raw material is difficult. The resulting ultrafine cellulose fibers have poor stability. If the amount of the phosphoric acid group introduced exceeds 2.0 mmol/g, an adequate viscosity cannot be obtained.

In this context, the amount of the phosphoric acid group introduced to the fiber raw material is measured by a conductometric titration method which involves performing ultrafine fiber formation by the defibration treatment step, treating the obtained slurry containing the ultrafine cellulose fibers with an ion-exchange resin, and then determining change in electrical conductivity while adding an aqueous sodium hydroxide solution thereto.

The conductometric titration confers a curve shown in FIG. 1 as an alkali is added. First, the electrical conductivity is abruptly reduced (hereinafter, this region is referred to as the "first region"). Then, the conductivity starts to rise slightly (hereinafter, this region is referred to as the "second region"). Then, the increment of the conductivity is increased (hereinafter, this region is referred to as the "third region"). In short, three regions appear. The amount of the alkali required for the first region among these regions is equal to the amount of a strongly acidic group in the slurry used in the titration. The amount of the alkali required for the second region is equal to the amount of a weakly acidic group in the slurry used in the titration. When the condensation of the phosphoric acid group occurs, the weakly acidic group is apparently lost so that the amount of the alkali required for the second region is decreased as compared with the amount of the alkali required for the first region. On the other hand, the amount of the strongly acidic group agrees with the amount of the phosphorus atom regardless of the presence or absence of condensation. Therefore, the simple term "amount of the phosphoric acid group introduced (or amount of the phosphoric acid group)" or "amount of the substituent introduced (or amount of the substituent)" refers to the amount of the strongly acidic group.

<Properties of Composition>

The subterranean formation processing composition of the present invention comprising ultrafine cellulose fibers having a substituent has a thickening property. The thickening property refers to a property that increases the viscosity of mud water to a given or higher level when the composition is mixed with the mud water. The measurement value of the viscosity of the mud water increased by the subterranean formation processing composition of the present invention is 19000 mPa·s or higher measured by a method given below. The viscosity is preferably 20500 mPa·s or higher, more preferably 37000 mPa·s or higher.

The composition of the present invention comprising ultrafine cellulose fibers having a substituent has a high thickening property.

Measurement of Viscosity:

The fibers are diluted with water to have a solid content of 0.2% by mass. To 1000 mL of the dilution, 50 g of bentonite (e.g., Kunigel V1, Kunimine Industries Co., Ltd.) is added, and the mixture is fully stirred and then left standing to prepare sufficiently hydrated mud water. The viscosity of the obtained liquid is measured at 25° C. at 3 rpm (3 min) using a type B viscometer (No. 2 and No. 3 rotors) (e.g., manufactured by Brookfield Engineering, analog viscometer T-LVT).

The subterranean formation processing composition of the present invention has a water stopping property. The phrase "subterranean formation processing composition has a water stopping property" means that the amount of water filtered is 30 ml or lower in a water stopping property test given below. The amount of water filtered is preferably 20 ml or lower, more preferably 10 ml or lower.

Water Stopping Property Test:

The amount of water filtered is measured when a pressure of 3 kg/cm2G is applied to 200 mL of the aforementioned mud water having a fiber solid content of 0.2% by mass at room temperature for 30 minutes using a filtration tester based on the API specification at 25° C.

The subterranean formation processing composition of the present invention comprising ultrafine cellulose fibers having a substituent has a stable viscosity against change in temperature. Whether the viscosity is stable (or the viscosity stability is high) can be evaluated on the basis of the rate of maintenance. The rate of maintenance refers to the percentage (%) of the viscosity of a dispersion at a temperature of 30° C. to 80° C. (any one temperature from 30° C. to 80° C., for example, 75° C.) to the viscosity at 25° C. when the ultrafine fibers are dispersed in water at a solid concentration of 0.2 to 0.4% by mass.

The rate of maintenance can be represented by the following expression:

Rate of maintenance=Viscosity at each temperature/ Viscosity at 25° C.×100.

The composition of the present invention comprising ultrafine cellulose fibers having a substituent has a stable viscosity against change in temperature.

The stable viscosity refers to a rate of maintenance of 60% or more. The stable viscosity preferably refers to a rate of maintenance of 60% or more at 75° C. Specifically, the viscosity at a temperature of 30° C. to 80° C. is 60% or more with respect to the viscosity at 25° C. when the composition of the present invention is dispersed in water such that the solid concentration of the cellulose fibers is 0.2 to 0.4% by mass.

<Concentration, Drying, etc., of Dispersion>

The composition of the present invention comprising the ultrafine cellulose fibers of the present invention can be prepared in various forms such as solid matter, slurry, a dried product, and a concentrate. The composition is dispersed in an aqueous dispersion medium in use and therefore, may be processed so as to easily disperse the composition. The composition is desirably provided in the form of a concentrate or a dried product from the viewpoint of handleability during transport or at the site of work.

The solid concentration of the ultrafine cellulose fibers in the concentrate or the dried product is 5% by mass or more and 100% by mass or smaller, more preferably 20% by mass or more and 100% by mass or smaller, further preferably 85% by mass or more and 100% by mass or smaller, from the viewpoint of handleability.

Examples of the method for concentration or drying include, but are not particularly limited to, a method of adding a concentrating agent to a liquid containing the ultrafine fibers, and a method using a dryer for general use. Also, a method known in the art, for example, a method described in WO2014/024876, WO2012/107642, and WO2013/121086 can be used.

Examples of the concentrating agent include an acid, an alkali, a salt of a polyvalent metal, a cationic surfactant, an anionic surfactant, a cationic polymer coagulant, and an anionic polymer coagulant More specific examples thereof include aluminum sulfate (sulfuric acid band), polyaluminum chloride, calcium chloride, aluminum chloride, magnesium chloride, potassium chloride, calcium sulfate, magnesium sulfate, potassium sulfate, lithium phosphate, potassium phosphate, trisodium phosphate, disodium hydrogen phosphate, inorganic acids (sulfuric acid, hydrochloric acid, nitric acid, phosphoric acid, etc.), organic acids (formic acid, acetic acid, citric acid, malic acid, lactic acid, adipic acid, sebacic acid, stearic acid, maleic acid, succinic acid, tartaric acid, fumaric acid, gluconic acid, etc.), cationic surfactants (quaternary ammonium salts such as alkyl trimethylammonium salt, dialkyl dimethylammonium salt, alkyl dimethylbenzylammonium salt, acylaminoethyl diethylammonium salt, acylaminoethyl diethylamine salt, alkylamide propyl dimethylbenzylammonium salt, alkylpyridinium salt, alkylpyridinium sulfate, stearamide methylpyridinium salt, alkylquinolinium salt, alkylisoquinolinium salt, fatty acid polyethylene polyamide, acylaminoethylpyridinium salt, and acylcolaminoformylmethylpyridinium salt; ester-bonded amines or ether-bonded quaternary ammonium salts such as stearoxymethylpyridinium salt, fatty acid triethanolamine, fatty acid triethanolamine formate, trioxyethylene fatty acid triethanolamine, cetyloxymethylpyridinium salt, and p-isooctylphenoxyethoxyethyl dimethylbenzylammonium salt; heterocyclic amines such as alkylimidazoline, 1-hydroxyethyl-2-alkylimidazoline, 1-acetylaminoethyl-2-alkylimidazoline, and 2-alkyl-4-methyl-4-hydroxymethyloxazoline; amine derivatives such as polyoxyethylene alkylamine, N-alkylpropylenediamine, N-alkylpolyethylene polyamine, N-alkylpolyethylene polyamine dimethylsulfate, alkylbiguanide, long-chain amine oxide; etc.), cationic polymer coagulants (copolymers of acrylamide with cationic monomers such as dialkylaminoalkyl (meth)acrylate, dialkylaminoalkyl (meth)acrylamide, or their salts or quaternized compounds, and homopolymers or copolymers of these cationic monomers, etc.), alkalis (lithium hydroxide, sodium hydroxide, potassium hydroxide, calcium hydroxide, lithium carbonate, lithium bicarbonate, potassium carbonate, potassium bicarbonate, sodium carbonate, sodium bicarbonate, calcium carbonate, calcium phosphate, calcium hydrogen phosphate, ammonia, hydrazine, methylamine, ethylamine, diethylamine, triethylamine, propylamine, dipropylamine, butylamine, diaminoethane, diaminopropane, diaminobutane, diaminopentane, diaminohexane, cyclohexylamine, aniline, tetramethylammonium hydroxide, tetraethylammonium hydroxide, tetrapropylammonium hydroxide, tetrabutylammonium hydroxide, benzyltrimethylammonium hydroxide, pyridine, N,N-dimethyl-4-aminopyridine, etc.), anionic surfactants (sodium oleate, potassium oleate, sodium laurate, sodium dodecylbenzenesulfonate, sodium alkylnaphthalenesulfonate, sodium dialkylsulfosuccinate, sodium polyoxyethylene alkyl ether sulfate, sodium polyoxyethylene alkyl allyl ether sulfate, sodium polyoxyethylene dialkyl sulfate, polyoxyethylene alkyl ether phosphoric acid ester, polyoxyethylene alkyl ally ether phosphoric acid ester, etc.), and anionic polymer coagulants (copolymers of polyacrylic acid, sodium polyacrylate, (meth)acrylic acid, or their alkali metal salts with (meth)acrylamide, hydrolysates of poly(meth)acrylamide, copolymers of vinylsulfonic acids such as acryloylamino-2-methylpropylsulfonic acid, styrenesulfonic acid, vinylsulfonic acid or their salts, (meth)acrylic acid or its alkali metal salts, and (meth)acrylamide, carboxymethylcellulose, carboxymethyl starch, sodium alginate, etc.).

In the case of preparing the concentrate liquid or the dried product of the composition comprising ultrafine cellulose fibers, the pH of the solution after the re-dispersion is adjusted to 7 to 14 when the ultrafine cellulose fibers have no or negative surface charge, and the pH of the solution after the re-dispersion is adjusted to the range of 2 to 7 when the ultrafine cellulose fibers have positive surface charge.

In the case of preparing the concentrate liquid or the dried product of the composition comprising ultrafine cellulose fibers, a salt of a polyvalent metal, a cationic surfactant, or a cationic polymer coagulant can be added to the matter comprising ultrafine cellulose fibers to adjust the solid concentration of the ultrafine cellulose fibers to 5% by mass or more, preferably 10% by mass or more, more preferably 20% by mass or more.

In the case of preparing the concentrate liquid or the dried product of the composition comprising ultrafine cellulose fibers, the step of dipping the concentrate liquid or the dried product of the ultrafine cellulose fibers containing a salt of a polyvalent metal, a cationic surfactant, or a cationic polymer coagulant, in an acidic liquid to remove the salt of a polyvalent metal, the cationic surfactant, or the cationic polymer coagulant can also be adopted. The solid concentration of the concentrate liquid or the dried product is preferably 5% by mass or more, more preferably 10% by mass or more, further preferably 20% by mass or more.

Alternatively, the step of dipping the concentrate liquid or the dried product of the ultrafine cellulose fibers containing a salt of a polyvalent metal, a cationic surfactant, or a cationic polymer coagulant, in a liquid comprising an organic solvent (which can be in a liquid state and may be a solution or may be a suspension or an emulsion) can also be adopted. The solid concentration of the concentrate liquid or the dried product is preferably 5% by mass or more, more preferably 10% by mass or more, further preferably 20% by mass or more.

In the case of preparing the concentrate liquid or the dried product of the composition comprising ultrafine cellulose fibers, the step of adding an organic solvent to the matter comprising ultrafine cellulose fibers having a solid content of 20% by mass or smaller to adjust the solid concentration of the ultrafine cellulose fibers to 20% by mass or more can also be adopted.

In the case of preparing the concentrate liquid or the dried product of the composition comprising ultrafine cellulose fibers, the step of evaporating water by heating of the matter comprising ultrafine cellulose fibers having a solid content of 20% by mass or smaller to adjust the solid concentration of the ultrafine cellulose fibers to 20% by mass or more can also be adopted.

After the dehydration of the composition of the ultrafine cellulose fibers using the concentrating agent, washing with an acidic liquid (acidic liquid matter, for example, an acidic solution) or dipping in an acidic liquid may be performed in order to remove the concentrating agent remaining in the composition.

The acid used is not particularly limited. For example, an inorganic acid (e.g., sulfuric acid, nitric acid, hydrochloric acid, hydrobromic acid, hydroiodic acid, hypochlorous acid, chlorous acid, chloric acid, perchloric acid, phosphoric acid, and boric acid), a sulfonic acid (e.g., methanesulfonic acid, ethanesulfonic acid, benzenestilfonic acid, p-toluenesulfonic acid, and trifluoromethanesulfonic acid), or a carboxylic acid (e.g., formic acid, acetic acid, citric acid, gluconic acid, lactic acid, oxalic acid, and tartaric acid) can be used.

The concentration of the acidic liquid used is not particularly limited and is preferably 10% or lower, more preferably 5% or lower, further preferably 1% or lower. Too high a concentration might cause deterioration due to the decomposition of cellulose.

The mass of the acidic liquid used is not particularly limited and is preferably 100 to 100000% by mass, more preferably 1000 to 10000% by mass, with respect to the absolute dry mass of the ultrafine cellulose fibers.

Dehydration using an organic solvent may be used as a concentration method. After the concentration using the organic solvent, the concentrate may be dried. The drying after the treatment with the organic solvent can suppress a hydrogen bond in the ultrafine cellulose fibers and is preferred from the viewpoint of re-dispersibility.

The organic solvent is not particularly limited as long as the organic solvent is an organic compound having the property of dissolving other substances, and examples thereof can include the following: methanol, ethanol, 1-propanol (n-propanol), 1-butanol (n-butanol), 2-butanol, isobutyl alcohol, isopropyl alcohol (isopropanol, 2-propanol), isopentyl alcohol (isoamyl alcohol), t-butyl alcohol (2-methyl-2-propanol), 1,2-dioxane, 1,3-dioxane, 1,4-dioxane, tetrahydrofuran (THF), acetone, methyl isobutyl ketone, methyl ethyl ketone (MEK), methylcyclohexanol, methylcyclohexanone, methyl-n-butyl ketone, ethyl ether (diethyl ether), ethylene glycol monoethyl ether (cellosolve), ethylene glycol monoethyl ether acetate (cellosolve acetate), ethylene glycol mono-n-butyl ether (butylcellosolve), ethylene glycol monomethyl ether (methylcellosolve), dimethyl sulfoxide (DMSO), dimethylformamide (DMF, N,N-dimethylformamide), dimethylacetamide (DMAc, DMA, N,N-dimethylacetamide), o-dichlorobenzene, xylene, cresol, chlorobenzene, isobutyl acetate, isopropyl acetate, isopentyl acetate (isoamyl acetate), ethyl acetate, n-butyl acetate, n-propyl acetate, n-pentyl acetate (n-amyl acetate), methyl acetate, cyclohexanol, cyclohexanone, dichloromethane (methylene dichloride), styrene, tetrachloroethylene (perchloroethylene), 1,1,1-trichloroethane, toluene, n-hexane, chloroform, carbon tetrachloride, 1,2-dichloroethane (ethylene dichloride), 1,2-dichloroethylene (acetylene dichloride), 1,1,2,2-tetrachloroethane (acetylene tetrachloride), trichloroethylene, carbon disulfide, gasoline, coal tar naphtha (including solvent naphtha), petroleum ether, petroleum naphtha, petroleum benzine, turpentine oil, and mineral spirits (including mineral thinners, petroleum spirits, white spirits, and mineral turpentine).

The organic solvent is not particularly limited and preferably has miscibility with water and more preferably further has polarity. Preferred examples of the organic solvent having polarity include, but are not particularly limited to, alcohols, dioxanes (1,2-dioxane, 1,3-dioxane, and 1,4-dioxane), and tetrahydrofuran (THF). Specific examples of the alcohols include methanol, ethanol, n-propanol, isopropanol, n-butanol, and t-butyl alcohol. Other preferred examples of the organic solvent having polarity include ketones, ethers, dimethyl sulfoxide (DMSO), dimethylformamide (DMF), and dimethylacetamide (DMAc). Examples of the ketones include acetone and methyl ethyl ketone (MEK). Examples of the ethers include diethyl ether and tetrahydrofuran (THF). The organic solvent may be selected in consideration of a solubility parameter value (SP value). It is empirically known that a smaller difference between the SP values of two components means larger solubility. Therefore, an organic solvent having an SP value close to that of water can be selected from the viewpoint of good miscibility with water.

The concentration or the drying may be performed by combining the concentrating agent and the organic solvent. Although the order is not particularly limited, the treatment with the organic solvent is preferably performed after the concentration using the concentrating agent because the amount of the organic solvent used can be decreased.

In the case of performing the concentration or the drying by combining the concentrating agent and the organic solvent, it is preferred to adjust the ultrafine cellulose fiber concentration to 5% by mass or more, more preferably 10% by mass or more, further preferably 20% by mass or more, using the concentrating agent prior to the addition of the organic solvent. If the ultrafine cellulose fiber concentration is less than 5% by mass, this is not preferred because the necessary amount of the organic solvent is increased.

An alkaline or acidic solution may be added before, after, or during the treatment with the organic solvent. The addition of the alkaline solution increases the charge of the ultrafine cellulose fibers for the re-dispersion of the concentrate so that the concentrate is easily re-dispersed. Since the addition of the alkaline solution might swell the concentrate and deteriorate the degree of concentration, it is preferred to add the alkaline solution in the presence of an organic solvent. The organic solvent can suppress the swelling.

The acidic solution is used for removing the concentrating agent from the concentrate or the dried product of the ultrafine cellulose fibers and can suppress the swelling of the concentrating agent-free concentrate or dried product of the ultrafine cellulose fibers in the presence of an organic solvent.

The amount of the organic solvent used in the combined use of the concentrating agent and the organic solvent is not particularly limited and is preferably 100 to 100000% by mass, more preferably 100 to 10000% by mass, further preferably 100 to 1000% by mass, with respect to the absolute dry mass of the ultrafine cellulose fibers. More than 100000% by mass of the organic solvent is not desirable because the large amount of the organic solvent used increases cost. On the other hand, less than 100% by mass of the organic solvent is not preferred because the effect of suppressing the swelling of the ultrafine cellulose fibers is not sufficient.

One type of these concentrating agents may be used, or two or more thereof may be used in combination. Examples of the drying method include a method using a dryer for general use.

In the re-dispersion step, it is desirable that the pH of the dispersion should be adjusted to 7 or higher and 14 or lower when the cellulose fibers have no or negative surface charge. It is also desirable that the pH of the dispersion should be adjusted to the range of 2 to 7 when the cellulose fibers have positive surface charge.

In the concentration or drying step, the ultrafine cellulose dispersion before the concentration or the drying may contain an additive. Examples of the type of the additive include, but are not particularly limited to, a thickener. Examples of the type of the thickener include, but are not particularly limited to, carboxymethylcellulose, xanthan gum, guar gum, gum arabic, tragacanth gum, galactan, carob gum, karaya gum, carrageenan, pectin, agar, quince seeds (*Cydonia oblonga*), algae colloids (brown alga extracts), starch (rise, corn, potato, and wheat), glycyrrhizin, dextran, succinoglucan, pullulan, collagen, casein, albumin, gelatin, and polysaccharides such as oligosaccharide.

When the concentrate or the dried product is obtained by the method such as concentration or drying, the concentrate or the dried product can be re-dispersed in a solvent such as water. The viscosity of the aqueous solution containing the ultrafine cellulose fibers thus re-dispersed is an adequate viscosity as compared with the ultrafine cellulose fiber dispersion before the concentration or the drying and is also highly stable in the range of 20° C. to 80° C.

[Intended Use]
<Intended Use as Composition>

The subterranean formation processing composition comprising ultrafine cellulose fibers having a substituent according to one aspect of the present invention (also simply referred to as the "composition of the present invention comprising ultrafine cellulose fibers" or the "composition of the present invention") is capable of variously altering the properties of a fluid by addition to the fluid and as such, can be used for various purposes by exploiting such properties.

The composition comprising ultrafine cellulose fibers according to one aspect of the present invention (also simply referred to as the "composition of the present invention comprising ultrafine cellulose fibers" or the "composition of the present invention") can be used without particular limitations for the same purposes as those of conventional ultrafine cellulose fibers or cellulose-based materials (cellulose derivatives, crystalline cellulose, and bacterial cellulose). The composition of the present invention can be used as, for example, a thickener, a dispersant, an emulsifier, a suspending agent, a stabilizer, a friction reducer, or a refrigerant. Also, the composition of the present invention can be added to cosmetics, food products (also including liquid foods such as drinks and also including foods not only for humans but for nonhuman animals), pharmaceutical products, agricultural chemicals, chemicals, paints, etc.), or the like and used for these purposes.

The composition of the present invention comprising ultrafine cellulose fibers having a substituent exerts excellent temperature stability, and its viscosity is not reduced even in a high-temperature fluid. Therefore, the composition of the present invention can be used as a thickener in a fluid for use in very deep subterranean formation processing.

The composition of the present invention comprising ultrafine cellulose fibers can also exert an excellent water stopping property and as such, can be used as a lost circulation preventing agent or a dehydration adjuster in a subterranean formation processing fluid.

The composition of the present invention comprising ultrafine cellulose fibers has thixotropy and can therefore exert the excellent ability to form side walls when used in mud water. The composition of the present invention can facilitate the press filling of cement when used in a cementing fluid. Thus, the composition of the present invention can be used as a side wall-forming agent or a cementing adjuster.

The composition of the present invention comprising ultrafine cellulose fibers can also exert an emulsification function by capturing oil droplets into the network of the ultrafine fibers in a subterranean formation processing fluid and as such, can be expected to be used as an emulsifier. Specifically, the composition of the present invention can be used for the subterranean formation processing fluid as an emulsion and can be used for stabilizing an emulsion substance contained in the subterranean formation processing fluid. The composition of the present invention comprising ultrafine cellulose fibers can be used even in an environment of high temperatures, for example, up to 300° C. The ultrafine cellulose fibers have a decomposition temperature of 300° C. and have neither melting point nor glass transition temperature due to high crystallinity. Unlike general resins, the ultrafine cellulose fibers are therefore free from settling. Therefore, the composition of the present invention can be used even in a very deep water well.

The composition of the present invention comprising ultrafine cellulose fibers can be dispersed in an appropriate dispersion medium for use. The dispersion medium is not particularly limited as long as the dispersion medium can disperse the ultrafine cellulose fibers. Water, an organic solvent, an oil (e.g., light oil, mineral oil, synthetic oil, edible oil, and nonedible oil), or the like can be used.

The ultrafine cellulose fibers contained in the composition of the present invention can be decomposed using a breaker. The decomposition can control the viscosity or prevent residues in a subterranean formation. Various components that can decompose the cellulose fibers can be used as the breaker. Examples thereof include, but are not limited to, oxidizing agents such as ammonium persulfate and sodium persulfate, acids such as hydrochloric acid and sulfuric acid, and enzymes such as cellulase.

The ultrafine cellulose fibers contained in the composition of the present invention can be cross-linked with the aim of improving a viscosity effect or the like. Various components that can cross-link the cellulose fibers can be used as the cross-linking agent. Examples thereof include, but are not limited to, borate, potassium hydroxide, nitrate, zirconium, and titanium.

<Fluid>

The composition of the present invention can be used, as mentioned above, for thickening, lost circulation prevention, dehydration adjustment, emulsification, side wall formation, and cementing adjustment. Also, the composition of the present invention is resistant to temperatures, acids, alkalis, and salts and as such, can be added, for use, to various fluids for use in subterranean formation processing, for example, well drilling. Such a fluid includes, for example, a fracturing fluid, mud water, a cementing fluid, a well control fluid, a well kill fluid, an acid fracturing fluid, an acid diverting fluid, a stimulation fluid, a sand control fluid, a completion fluid, a wellbore consolidation fluid, a remediation treatment fluid, a spacer fluid, a drilling fluid, a frac-packing fluid, a water conformance fluid, and a gravel packing fluid.

When the composition of the present invention comprising ultrafine cellulose fibers is contained in a fluid for use, the content is not particularly limited as long as the intended effect is exerted. Typically, the fluid can contain 0.005 to 10% by mass, preferably 0.01 to 5% by mass, of the cellulose fibers in terms of the solid concentration (as the total amount of the cellulose fibers). More preferably, the solid concentration of the cellulose fibers in the fluid is 0.05 to 2% by mass from the viewpoint that the water stopping property can be sufficiently exerted even at a high temperature.

<Other Components in Fluid>

The fluid provided by the present invention may contain various components that are added to conventional fluids for subterranean formation processing, in addition to the composition of the present invention comprising ultrafine cellulose fibers. Examples of the components to be added can include, but are not limited to, weighting materials, viscosity adjusters, dispersants, coagulants, lost circulation preventing agents, dehydration adjusters, pH adjusters, friction reducers, hygroscopic expansion controlling agents, emulsifiers, surfactants, biocides, antifoaming agents, scale preventives, corrosion inhibitors, temperature stabilizers, resin coating agents, crack support materials, salts, and proppants. Only one of these components may be added, or two or more thereof may be added.

The weighting material is used for enhancing the specific gravity of the fluid, stabilizing bare side walls, and preventing burst of gas, water, or the like. A mineral such as barite or hematite can be used as the weighting material, though the weighting material is not limited thereto.

The viscosity adjuster is also called gelling agent, thickener, or mud conditioning agent and is used for optimizing the viscosity of the fluid. In addition to minerals such as bentonite, attapulgite, sepiolite, and synthetic smectite, water-soluble natural and synthetic polymers are used as components therefor. One preferred example of the water-soluble polymer includes a polymer derived from a natural polysaccharide. Specific examples of the viscosity adjuster include, but are not limited to, natural products or natural product-derived ones such as guar gum and guar gum derivatives, water-soluble cellulose derivatives such as methylcellulose, ethylcellulose, hydroxyethylcellulose, hydroxypropylmethylcellulose, hydroxyethylmethylcellulose, glyoxal-added hydroxypropylmethylcellulose, carboxymethylcellulose, and carboxyethylcellulose, gum arabic, alginic acid and its esters, alginate, elemi resin, ghatti gum, carrageenan, karaya gum, carob bean gum, thickening polysaccharides, tamarind gum, tragacanth gum, starch glycolate, starch acid salts, furcellaran, glucose, glucose polysaccharides, sucrose, and xanthan gum. Examples of the synthetic polymer include, but are not limited to, partially hydrolyzed polyacrylamide (PHPA polymer), polyvinyl alcohol, and polyacrylate polymers.

The lost circulation preventing agent is used for preventing the runoff of the subterranean formation processing fluid. Sawdust, straw, cellophane, cement, pulp fibers, polylactic acid, polyglycolic acid, polyarylate, or the like can be used as the lost circulation preventing agent, though the lost circulation preventing agent is not limited thereto.

The dehydration adjuster is used for decreasing dehydration and strengthening the protection of side walls. A sulfonated asphalt derivative, a starch derivative, polyarylate, a polyanionic cellulose polymer, or the like is used as the dehydration adjuster, though the dehydration adjuster is not limited thereto.

The emulsifier is used for dispersing, in one liquid, the other liquid that is usually less miscible therewith. Examples of the emulsifier include, but are not limited to, glycerin ester, saponin, sucrose fatty acid ester, lecithin, polyethylene glycol, polyoxyethylene cetyl ether, polyoxyethylene oleyl ether, polyoxyethylene stearyl ether, polyoxyethylene lauryl ether, polyoxyethylene octyl dodecyl ether, polyoxyethylene decyl tetradecyl ether, polyoxyethylene behenyl ether, ethyl caprate, cetyl palmitate, stearyl stearate, cetyl octanoate, hexyldecyl isostearate, octyl isononanoate, dodecyl isononanoate, glycerin stearate, glycerin palmitate, glycerin tri(caprylate-caprate), sorbitan monostearate, sorbitan oleate, propylene glycol stearate, propylene glycol oleate, propylene glycol laurate, glycol stearate, glycol dioleate, polyethylene glycol monostearate, polyoxyethylene glycol isostearate, polyoxyethylene hydrogenated castor oil laurate, polyoxyethylene hydrogenated castor oil, polyoxyethylene sorbitan fatty acid ester, and dimethicone copolyol.

The proppant is solid matter of approximately 0.5 mm and is used for being pushed in, for example, a fracturing crack and supporting the crack so as not to close the crack. Examples of the proppant include, but are not limited to, sand, glass beads, ceramic particles, and resin-coated sand.

(Mud Water)

A preferred embodiment provides mud water for use in well drilling, comprising the composition of the present invention comprising ultrafine cellulose fibers. The content of the cellulose fibers in the mud water is not particularly limited as long as the intended effect is exerted. The mud water contains, for example, 0.004 to 40% by mass, preferably 0.04 to 4% by mass, more preferably 0.08 to 2% by mass, of the cellulose fibers in terms of the solid concentration (as the total amount of the cellulose fibers).

The mud water for use in well drilling is generally used for removing cuttings from a bottom hole and transporting the cuttings aboveground. The mud water also has roles in preventing the unintended flow of the fluid into a well or gushing of the fluid to above ground by controlling the internal pressure of the well, preventing the collapse of a subterranean formation by protecting side walls, and cooling an instrument in a well by decreasing the friction between a drill string and side walls. The mud water also has a role in providing information on the underground by transporting cuttings or gas. The mud water includes bentonite mud water, lignosulfonate mud, KCl polymer mud, oil-based mud water, and the like. The present embodiment provides various mud waters.

In general, the bentonite mud water is inexpensive and easily handled, but is vulnerable to salts or cement and is easily gelled. In order to compensate for these disadvantages, carboxymethylcellulose or the like has heretofore been added thereto in some cases. The present invention can provide bentonite mud water having higher performance.

The present embodiment provides disperse mud water comprising the composition of the present invention comprising ultrafine cellulose fibers. Such mud water can contain conventional lignosulfonate (also referred to as ligninsulfonic acid) as a dispersant, lignite (humic acid derivative), a pH adjuster (e.g., sodium hydroxide), and a weighting material. The disperse mud water provided by the present embodiment can be expected to be further enhanced in terms of a mudstone-protecting function, easy control of viscosity or specific gravity, and resistance to temperatures (reportedly, the general operating temperature of lignosulfonate mud is approximately 175° C. and the general operating temperature of lignite mud is approximately 190° C.), salts, cement, etc., as compared with conventional lignosulfonate mud.

The mud water provided by the present embodiment can also be constituted as KCl mud. K ions are known to be very excellent in the effect of suppressing the swelling or dispersion of clay. On the other hand, K ions have too strong power of aggregation and as such, have heretofore been used in combination with xanthan gum or a partially hydrolyzed polyacrylamide (PHPA) polymer, which can exert a thickening property or a protective colloidal property even in a liquid containing a large amount of K ions. In the present embodiment, the composition comprising ultrafine cellulose fibers provided by the present invention can be used together with xanthan gum or PHPA or instead thereof. The KCl mud provided by the present embodiment can be expected to be further enhanced in terms of a mudstone-protecting function, easy control of viscosity or specific gravity, and resistance to salts, cement, etc., as compared with conventional KCl-polymer mud.

The mud water provided by the present embodiment can also be constituted as oil-based mud water. The oil-based mud water contains oil mud having an oil content of 95% or more, and invert emulsion oil mud which is a water-oil-in emulsion prepared using 15 to 35% of water and an emulsifier. The oil-based mud water generally has advantages such as the suppression of hydration or swelling of a mudstone layer, high-temperature stability, lubricity, the prevention of productivity from being damaged by the invasion of water into an oil layer, low likelihood to corrode metals, and little deterioration attributed to putrefaction, as compared with water-based mud. The present embodiment can be expected to provide oil-based mud water that exploits these properties while further improving them.

(Fracturing Fluid)

A preferred embodiment provides a fracturing fluid for use in hydraulic fracturing, comprising the composition of the present invention comprising ultrafine cellulose fibers. The content of the cellulose fibers in the fracturing fluid is not particularly limited as long as the intended effect is exerted. The fracturing fluid contains, for example, 0.002 to 20% by mass, preferably 0.02 to 2% by mass, more preferably 0.04 to 1% by mass, of the cellulose fibers in terms of the solid concentration (as the total amount of the cellulose fibers).

The fracturing fluid generally contains approximately 90 to 95% by mass of water or an organic solvent as a solvent or a dispersion medium and contains approximately 5 to 9% by mass of a proppant (support). The fracturing fluid optionally further contains approximately 0.5 to 1% by mass of various additives such as a gelling agent, a scale preventive, an acid for dissolving rocks, etc., and a friction reducer. These components and additives can also be contained in the same ranges as above in the fracturing fluid provided by the present embodiment.

The ultrafine cellulose fibers in the fracturing fluid can perform the stable dispersion of the proppant as well as flexible viscosity control by further improvement in viscosity through cross-linking reaction and by reduction in the viscosity of the fluid caused by decomposition after use. Also, the ultrafine cellulose fibers can also be used as a degradable lost circulation preventing agent in the fracturing fluid. The ultrafine cellulose fibers can form better cracks because the internal pressure of well is easily applied by preventing lost circulation. The addition of a conventional lost circulation preventing agent to the fracturing fluid might clog the output passage of gas. By contrast, the lost circulation preventing agent consisting of the ultrafine cellulose fibers does not clog the output passage by decomposition after use.

The fracturing fluid or the like is required to be highly viscous for stably dispersing the proppant in the fluid at the time of transport of the proppant to a subterranean formation. In the subterranean formation having an ultrahigh temperature, the thickener is destroyed with a breaker or the like after the fracturing to reduce the viscosity. In general, the ultrafine cellulose fibers have highly crystallinity and therefore are not destroyed by the breaker. Thus, it is difficult to reduce the viscosity. The ultrafine cellulose fibers remaining without being decomposed allow the fluid to maintain the viscosity and hinder the fluid from being recovered aboveground. Therefore, the remaining ultrafine cellulose fibers might clog the passage of gas or oil, resulting in reduction in yield. It is known as to the esterified ultrafine cellulose fibers that the deesterification reaction proceeds at an ultrahigh temperature of 100° C. or higher (WO2013/176049). As the deesterification reaction proceeds, the dispersion stability of the ultrafine cellulose fibers is reduced to decrease the viscosity. The viscosity of the ultrafine cellulose fibers in the subterranean formation having an ultrahigh temperature can be controlled through the use of the deesterification reaction. The ultrafine cellulose fibers are not limited as long as the ultrafine cellulose fibers are in an esterified form. Phosphorylated ultrafine cellulose fibers are preferred because of easy production. Although sulfonated ultrafine cellulose fibers may be used, it is preferred to confirm whether the viscosity is sufficient because the sulfonation reaction may shorten the ultrafine cellulose fibers.

(Cementing Fluid)

A preferred embodiment provides a cementing fluid comprising the composition of the present invention comprising ultrafine cellulose fibers. The content of the cellulose fibers in the cementing fluid is not particularly limited as long as the intended effect is exerted. The cementing fluid contains, for example, 0.001 to 40% by mass, preferably 0.01 to 20% by mass, more preferably 0.05 to 5% by mass, of the cellulose fibers in terms of the solid concentration (as the total amount of the cellulose fibers).

General cement such as tricalcium silicate or high temperature-resistant cement such as class G cement for use in high-temperature wells can be used in the cementing fluid. A cementing agent such as a cement accelerator or a cement retarder can be used as an additive for the optimization of cementing time. Also, a cement dispersant, a fluidity-improving agent, a low-specific gravity or low-dehydration cement additive, or the like can be used. In addition, for example, a dehydration adjuster, a strength stabilizer, a weighting material, a cement spacer additive for improvement in substitution efficiency or mine washing, a chemical wash additive for side wall washing, a cement slurry antifoaming agent, a scale preventive, a lost circulation preventing agent, calcium aluminate, sodium polyphosphate, a fly ash, a foaming agent, a foam stabilizer, and gas in an amount sufficient for forming foams may be added thereto. The cementing fluid may contain inert particles of crushed rubber, if necessary, for imparting elasticity to its cured matter.

The ultrafine cellulose fibers form a three-dimensional network in water and can stably disperse even ultrafine substances. For example, 10 μm or smaller cement particles exist in the cementing fluid. The ultrafine cellulose fibers can stably disperse even 10 μm or smaller particles. The ultrafine cellulose fibers can also stably disperse hydrophobic particles into water and can also stably disperse, for example, hydrophobized pigment particles or minerals. The ultrafine cellulose fibers are highly hydrophilic and can therefore suppress the water separation of the cementing fluid. The ultrafine cellulose fibers are also highly resistant to salts and are therefore highly compatible with the cementing fluid rich in calcium.

For a high-temperature well, such as a geothermal well, which contains carbon dioxide, a cementing fluid that is not deteriorated in the presence of carbon dioxide containing salt water is desirable. A cement composition for use in geothermal wells or similar wells is preferably lightweight with a density in the range of, for example, approximately 9.5 to approximately 14 pounds/gallon (approximately 1.14 to approximately 1.68 g/cm3). The cementing fluid provided by the present embodiment can also be constituted to have a density in such a range.

<Method for Preparing Fluid Comprising Ultrafine Cellulose Fibers>

For dispersion in salt water, it is preferred to use an ultrafine cellulose dispersion containing less than 20% by mass, preferably 18% by mass or smaller, more preferably 16% by mass or smaller, further preferably 14% by mass or smaller, further preferably 12% by mass or smaller, further preferably 10% by mass or smaller, further preferably 8% by mass or smaller, further preferably 5% by mass or smaller, further preferably 2% by mass or smaller, further preferably 1% by mass or smaller, of the ultrafine cellulose fibers. The ultrafine cellulose fibers are diluted in advance. The resulting dilution can suppress the influence of salt water and can have high dispersibility even in the salt water. A solid salt may be added to the ultrafine cellulose fiber dispersion having an appropriate concentration or lower, or the dispersion may be prepared by the addition of salt water. The description will be given below by taking, as an example, the case where the concentration of the ultrafine cellulose fibers is 5% by mass or smaller. The description also holds true for the other appropriate concentrations.

The dispersion containing 5% by mass or smaller of the ultrafine cellulose fibers before the addition of a salt may be prepared by dispersing an ultrafine cellulose concentrate or dried product in water. Alternatively, this dispersion may be prepared by diluting the ultrafine cellulose fibers produced at a concentration of 5% by mass or more, or the ultrafine cellulose fibers may be produced at a concentration of 5% by mass or smaller.

The final concentration in salt water is not particularly limited and is 0.1% by mass or more, more preferably 0.5% by mass or more, further preferably 1% by mass or more, because of exerting the function of suppressing hydration or swelling.

The salt concentration of the ultrafine cellulose fiber dispersion before the addition to salt water is preferably 1% by mass or smaller, more preferably 0.5% by mass or smaller, further preferably 0.1% by mass or smaller. If the salt concentration is 1% by mass or more, the ultrafine cellulose fibers are poorly dispersible and do not exert adequate functions.

For the addition of the composition comprising ultrafine cellulose fibers into a fluid, the composition used is dispersed in various forms such as solid matter, slurry, a dried product, and a concentrate in an aqueous dispersion medium. The composition is desirably provided in the form of slurry, a concentrate, or a dried product of the ultrafine cellulose fibers produced at a high concentration from the viewpoint of handleability during transport or at the site of work. In order to simplify the production process of the concentrate or the dried product, the cellulose fibers before ultrafine fiber formation treatment may be transported to the site of subterranean formation processing, and the ultrafine fiber formation treatment can be performed on site.

The concentrate liquid or the dried product of the ultrafine cellulose fibers is re-dispersed by mixing with an aqueous solvent having a salt concentration of less than 1% by mass such that the ultrafine cellulose fibers become less than 5% by mass. Then, a salt can be added to the re-dispersion to obtain a fluid having a salt concentration of 0.1% by mass or more, 0.5% by mass or more, or 1.0% by mass or more.

The concentrate or the dried product of the ultrafine cellulose fibers may be processed so as to easily re-disperse the concentration or the dried product in a fluid. A general formula for use in improving the dispersibility of a natural polymer contained in a subterranean formation processing fluid can be used.

The concentrate or the dried product of the ultrafine cellulose fibers may be mixed in advance with various additives that are added to a subterranean formation processing fluid in the concentration or drying step.

In the case of performing the ultrafine fiber formation treatment on site, the cellulose fibers before the ultrafine fiber formation treatment are not particularly limited. Chemically treated cellulose fibers are excellent in ultrafine fiber formation efficiency and can therefore be expected to reduce the size of a defibration apparatus or minimize the number of the apparatus at a site having a limited plot of land. Among the chemically treated cellulose fibers, anionically or cationically treated cellulose fibers are preferred, and carboxylated, phosphorylated, or sulfonated cellulose fibers are more preferred.

In the case of performing the ultrafine fiber formation treatment on site, a general apparatus generally used in the production of ultrafine cellulose fibers can be used as a defibration apparatus. On the assumption that an unlimited number of wells would be drilled in the production of shale gas or oil, a defibration apparatus improved in transportability such as a dedicated vehicle loaded with a defibration apparatus at the back of a truck, or a defibration apparatus equipped with wheels or the like, is preferred for quick transfer of the defibration apparatus to near each well.

For the on-site ultrafine fiber formation treatment, the additives that are added to a subterranean formation processing fluid may be mixed in advance with the cellulose fiber dispersion before the ultrafine fiber formation, followed by defibration treatment. The dispersion containing the ultrafine cellulose fibers well mixed with the additives can be produced and can enhance the performance of the subterranean formation processing fluid.

For the on-site ultrafine fiber formation treatment, the solid concentration is preferably increased to 20% by mass or more before the ultrafine fiber formation treatment to the site from the viewpoint of the transportability of the cellulose fibers. This solid concentration is more preferably 50% by mass or more, further preferably 80% by mass or more. As the solid concentration is increased, the ultrafine fiber formation efficiency of the cellulose fibers might be reduced in the ultrafine fiber formation treatment. Therefore, a dispersant or the like may be added thereto in order to prevent the cellulose fibers from being bonded to each other.

For the on-site ultrafine fiber formation treatment, the solid concentration of the cellulose fibers in the ultrafine fiber formation treatment step is not particularly limited and is preferably 0.01% by mass or more and 50% by mass or smaller, more preferably 0.1% by mass or more and 30% by mass or smaller, further preferably 0.5% by mass or more and 20% by mass or smaller. Too high a solid concentration of the cellulose fibers does not promote the ultrafine fiber formation so that a large amount of coarse fibers remains. On the other hand, a low solid concentration of the cellulose fibers is not preferred from the viewpoint of productivity.

For the on-site ultrafine fiber formation treatment, the ultrafine cellulose fiber dispersion that has undergone the ultrafine fiber formation is mixed with other fluid components to prepare a fluid. The ultrafine cellulose fiber dispersion is very highly viscous and might thus be difficult to transport through a pump. A method to cope with this problem involves directly connecting a defibration apparatus to a fluid preparation tank and supplying the ultrafine cellulose fiber dispersion thereto, though the method is not particularly limited thereto. When a high-pressure defibration apparatus such as a high-pressure homogenizer is used, it is also possible to supply the ultrafine cellulose fiber dispersion to a fluid preparation tank through the use of treatment pressure.

[Method for processing subterranean formation and method for producing petroleum resource]

The present invention also provides a method for processing a subterranean formation using the composition of the present invention or the fluid mentioned above. The subterranean formation (also called stratum) also includes a subterranean formation of the sea bottom.

The subterranean formation processing includes well drilling that is used for various purposes. Examples of the well includes, but are not limited to, an exploratory well or a wildcat, an appraisal well, an exploratory well or an exploration well, a delineation well, a development well, a production well, an injection well, an observation well, and a service well.

Also, the subterranean formation processing includes the following:

Cementing: This is mainly performed for filling cement to the gaps between a casing and side walls after well drilling to fix the casing.

Borehole survey or well logging: This includes mud logging. The mud logging involves observing and analyzing gas or cuttings in circulated drilling mud. As a result, oil and gas layers can be detected early, and lithofacies in drilling can be determined.

Recovery of petroleum resources: This includes water flooding and chemical flooding.

Well stimulation: This is performed for the purpose of, for example, improving the nature of side walls or a reservoir near a well, and improving productivity. This includes acidizing which performs washing using hydrochloric acid or the like, and hydraulic fracturing, hydrofracturing, or fracking which secures a fluid passage by making cracks in a reservoir. For production from a sand sheet, this operation includes, for example, sand control for preventing the flow of sand into a well or damage on tubing or equipment by a fluid containing sand, and plastic consolidation which compresses sandstones by the press filling of a fluid containing a resin to a subterranean formation.

Well completion using water-based mud, oil-based mud water, a chemical fluid, or a brine.

Fracturing using a high-pressure fracturing fluid for forming a passage (crack or fracture) in a tight subterranean formation having a low permeability.

Well workover.

Well abandonment.

The present invention also provides a method for producing a petroleum resource using the composition or the fluid obtained by the present invention. The petroleum resource refers to every mineral hydrocarbon including solid, liquid, and gas, present in the underground. Typical examples of the petroleum resource include petroleum (oil) in a liquid form and natural gas in a gaseous form, which are general categories. The petroleum resource also includes conventional petroleum (oil) and natural gas as well as tight sand gas, shale oil, tight oil, heavy oil, extra heavy oil, shale gas, single-layer gas, bitumen, heavy fuel oil, oil sand, oil shale, and methane hydrate.

The present invention will be described in more detail with reference to Examples below. However, the present invention is not intended to be limited by these Examples.

EXAMPLES

Production Example 1

Preparation of Phosphorylated Cellulose:

100 g of urea, 5.5 g of sodium dihydrogen phosphate dihydrate, and 4.1 g of disodium hydrogen phosphate were dissolved in 109 g of water to prepare a phosphorylation reagent.

A sheet obtained by paper making from dried needle bleached kraft pulp was treated with a cutter mill and a pin mill to prepare cotton-like fibers. 100 g (absolute dry mass) of the cotton-like fibers was separated, and the phosphorylation reagent was evenly sprayed thereto. Then, the fibers were kneaded by hand to obtain chemical-impregnated pulp.

The obtained chemical-impregnated pulp was heat-treated for 80 minutes in an air-blow dryer with a damper heated to 140° C. to obtain phosphorylated pulp.

100 g (pulp mass) of the obtained phosphorylated pulp was separated, and 10 L of ion-exchange water was poured to the pulp, which was then uniformly dispersed by stirring, followed by filtration and dehydration to obtain a dehydrated sheet. This step was repeated twice. Subsequently, the obtained dehydrated sheet was diluted with 10 L of ion-exchange water, and a 1 N aqueous sodium hydroxide solution was added thereto in small portions with stirring to obtain pulp slurry having a pH of 12 to 13. Then, this pulp slurry was dehydrated to obtain a dehydrated sheet. Then, 10 L of ion-exchange water was poured to the dehydrated sheet, which was then uniformly dispersed by stirring, followed by filtration and dehydration to obtain a dehydrated sheet. This step was repeated twice. Absorption based on a phosphoric acid group was found at 1230 to 1290 cm-1 by the FT-IR measurement of infrared absorption spectra to confirm the addition of the phosphoric acid group. Accordingly, in the obtained phosphorus oxoacid-introduced cellulose, a portion of the hydroxy groups of cellulose was substituted by a functional group of the structural formula (1) given below. In the formula, each of a, b, m, and n is a natural number (provided that a=b×m). At least one of $\alpha^1, \alpha^2, \ldots, \alpha^n$, and $\alpha^1$ is O-, and the remaining moieties are any of R and OR. Each R is any of a hydrogen atom, a saturated linear hydrocarbon group, a saturated branched hydrocarbon group, a saturated cyclic hydrocarbon group, an unsaturated linear hydrocarbon group, an unsaturated branched hydrocarbon group, an aromatic group, and groups derived therefrom. β is a monovalent or higher valent cation consisting of organic matter or inorganic matter.

[Formula 1]

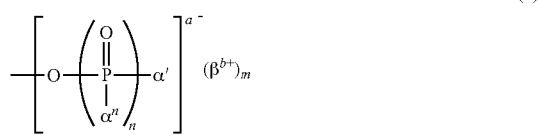

(1)

The phosphorylated cellulose was diluted with ion-exchange water to have a concentration of 0.5% by mass. Then, the dilution was subjected to defibration treatment for 30 minutes under a condition of 21500 rpm using a defibration treatment apparatus (manufactured by M Technique Co., Ltd., Clearmix-2.2S) to obtain phosphorylated ultrafine cellulose fibers 1. The cellulose maintained cellulose type I crystals in X-ray diffraction.

The amount of the phosphoric acid group introduced (amount of the substituent) was measured by the following method:

[Measurement of Amount of Phosphoric Acid Group Introduced]

The difference between the amounts of the phosphoric acid group-derived strongly acidic group and weakly acidic group introduced serves as a measure of the condensation of the phosphoric acid group. A smaller value of this difference confers more highly transparent slurry containing the ultrafine cellulose fibers with lower condensation of the phosphoric acid group. The amounts of the phosphoric acid group-derived strongly acidic group and weakly acidic group introduced were measured by directly diluting the slurry containing the ultrafine cellulose fibers after the defibration treatment with ion-exchange water to have a solid concentration of 0.2% by mass, followed by treatment with an ion-exchange resin and titration using an alkali. In the treatment with an ion-exchange resin, a strongly acidic ion-exchange resin (Amberjet 1024; Organo Corp.; conditioning agent) was added at a volume ratio of 1/10 to the slurry containing 0.2% by mass of ultrafine cellulose fibers, followed by shake treatment for 1 hour. Then, the suspension was poured to a mesh having an opening of 90 μm so that the slurry was separated from the resin. In the titration using an alkali, while a 0.1 N aqueous sodium hydroxide solution was added to the slurry containing the ultrafine cellulose fibers after the ion exchange, the change in the value of electrical conductivity exhibited by the slurry was measured.

Specifically, the amount of the alkali (mmol) required for the first region in the curve shown in FIG. 1 was divided by the solid content (g) in the shiny to be titrated to determine the amount of the strongly acidic group introduced (mmol/g). Also, the amount of the alkali (mmol) required for the second region in the curve shown in FIG. 1 was divided by the solid content (g) in the slurry to be titrated to determine the amount of the weakly acidic group introduced (mmol/g).

Production Example 2

Phosphorylated ultrafine cellulose fibers 2 were obtained in the same way as in Production Example 1 except that the amounts of sodium dihydrogen phosphate dihydrate and disodium hydrogen phosphate were changed to 11.6 g and 8.3 g, respectively. The cellulose maintained cellulose type I crystals in X-ray diffraction.

Production Example 3

Phosphorylated ultrafine cellulose fibers 3 were obtained in the same way as in Production Example 1 except that the amounts of sodium dihydrogen phosphate dihydrate and disodium hydrogen phosphate were changed to 55.3 g and 41.3 g, respectively. The cellulose maintained cellulose type I crystals in X-ray diffraction.

Production Example 4

Phosphorylated ultrafine cellulose fibers 4 were obtained in the same way as in Production Example 1 except that the amounts of sodium dihydrogen phosphate dihydrate and disodium hydrogen phosphate were changed to 110.6 g and 82.6 g, respectively. The cellulose maintained cellulose type I crystals in X-ray diffraction.

Production Example 5

Phosphorylated ultrafine cellulose fibers 5 were obtained in the same way as in Production Example 1 except that the amounts of sodium dihydrogen phosphate dihydrate and disodium hydrogen phosphate were changed to 165.9 g and 123.9 g, respectively.

Experimental Example 1

The phosphorylated ultrafine cellulose fibers 1 obtained in Production Example 1 were diluted to 0.75% by mass, and the viscosity was measured at 25° C. at 3 rpm (3 min) using a type B viscometer (manufactured by Brookfield Engineering, analog viscometer T-LVT). The results are shown in Table 1.

Experimental Example 2

The test was conducted by the same method as in Experimental Example 1 except that the phosphorylated ultrafine cellulose fibers 2 were used instead of the phosphorylated ultrafine cellulose fibers 1 in Experimental Example 1.

Experimental Example 3

The test was conducted by the same method as in Experimental Example 1 except that the phosphorylated ultrafine cellulose fibers 3 were used instead of the phosphorylated ultrafine cellulose fibers 1 in Experimental Example 1.

Experimental Example 4

The test was conducted by the same method as in Experimental Example 1 except that the phosphorylated ultrafine cellulose fibers 4 were used instead of the phosphorylated ultrafine cellulose fibers 1 in Experimental Example 1.

Experimental Example 5

The test was conducted by the same method as in Experimental Example 1 except that the phosphorylated ultrafine cellulose fibers 5 were used instead of the phosphorylated ultrafine cellulose fibers 1 in Experimental Example 1.

Experimental Example 6

The test was conducted by the same method as in Experimental Example 1 except that guar gum (manufactured by Wako Pure Chemical Industries, Ltd.) was used instead of the phosphorylated ultrafine cellulose fibers 1 in Experimental Example 1.

TABLE 1

| | | Amount of phosphoric acid group (mmol/g) | Viscosity (mPa · s) |
|---|---|---|---|
| Experimental Example 1 | Phosphorylated ultrafine cellulose fibers 1 | 0.09 | 770 |
| Experimental Example 2 | Phosphorylated ultrafine cellulose fibers 2 | 0.14 | 18500 |
| Experimental Example 3 | Phosphorylated ultrafine cellulose fibers 3 | 0.60 | 21360 |
| Experimental Example 4 | Phosphorylated ultrafine cellulose fibers 4 | 2.5 | 15600 |
| Experimental Example 5 | Phosphorylated ultrafine cellulose fibers 5 | 2.8 | 2540 |
| Experimental Example 6 | Guar gum | — | 780 |

As shown in Table 1, ultrafine cellulose fibers having an amount of the phosphoric acid group of 0.14 to 2.5 mmol/g yielded a dispersion having an adequate viscosity. On the other hand, in Experimental Example 1, nanosizing did not proceed due to insufficient phosphorylation reaction. Therefore, a large amount of coarse fibers remained, and adequate viscosity was not exerted. In Experimental Example 5, crystallinity was reduced due to too accelerated phosphorylation reaction. Therefore, adequate viscosity was not exerted. The tests using the phosphorylated ultrafine cellulose fibers of Experimental Examples 2 to 4 showed higher viscosity as compared with the test using the guar gum of Experimental Example 6.

Experimental Example 7

The phosphorylated ultrafine cellulose fibers 1 obtained in Production Example 1 were diluted to 0.2% by mass. To 1000 mL of the dilution, 50 g of bentonite (Kunigel V1, Kunimine Industries Co., Ltd.) was added, and the mixture was stirred at 3000 rpm for 60 minutes and then left standing for 24 hours to prepare sufficiently hydrated mud water. The viscosity of the obtained mud water was measured at 25° C. at 3 rpm (3 min) using a type B viscometer (manufactured by Brookfield Engineering, analog viscometer T-LVT). Also, the water filtration property (water stopping property) was measured by a water stopping property test according to a method described below. The results are shown in Table 2.

<Water Stopping Property Test>

The amount of water filtered was measured when a pressure of 3 kg/cm2G was applied to 200 mL of the obtained mud water at room temperature for 30 minutes using a filtration tester based on the API specification at 25° C. Specifically, a smaller amount of water filtered means more favorable water stopping performance.

Experimental Example 8

The test was conducted by the same method as in Experimental Example 7 except that the phosphorylated ultrafine cellulose fibers 2 were used instead of the phosphorylated ultrafine cellulose fibers 1 in Experimental Example 7.

Experimental Example 9

The test was conducted by the same method as in Experimental Example 7 except that the phosphorylated ultrafine cellulose fibers 3 were used instead of the phosphorylated ultrafine cellulose fibers 1 in Experimental Example 7.

Experimental Example 10

The test was conducted by the same method as in Experimental Example 7 except that the phosphorylated ultrafine cellulose fibers 4 were used instead of the phosphorylated ultrafine cellulose fibers 1 in Experimental Example 7.

Experimental Example 11

The test was conducted by the same method as in Experimental Example 7 except that the phosphorylated ultrafine cellulose fibers 5 were used instead of the phosphorylated ultrafine cellulose fibers 1 in Experimental Example 7.

Experimental Example 12

The test was conducted by the same method as in Experimental Example 7 except that guar gum (manufactured by Wako Pure Chemical Industries, Ltd.) was used instead of the phosphorylated ultrafine cellulose fibers 1 in Experimental Example 7.

TABLE 2

| | | Amount of phosphoric acid group (mmol/g) | Viscosity (mPa · s) | Amount of water filtered (ml) |
|---|---|---|---|---|
| Experimental Example 7 | Phosphorylated ultrafine cellulose fibers 1 | 0.09 | 19400 | 18.4 |
| Experimental Example 8 | Phosphorylated ultrafine cellulose fibers 2 | 0.14 | 38500 | 8.2 |
| Experimental Example 9 | Phosphorylated ultrafine cellulose fibers 3 | 0.60 | 44200 | 8.5 |
| Experimental Example 10 | Phosphorylated ultrafine cellulose fibers 4 | 2.5 | 37400 | 8.3 |
| Experimental Example 11 | Phosphorylated ultrafine cellulose fibers 5 | 2.8 | 20200 | 12.5 |
| Experimental Example 12 | Guar gum | — | 18600 | 18.2 |

An aqueous solution containing a mixture of ultrafine cellulose fibers having an amount of the phosphoric acid group of 0.14 to 2.5 mmol/g and bentonite was obtained as an aqueous solution having an adequate viscosity and had a high water filtration property (water stopping property).

Example 1

The phosphorylated ultrafine cellulose fibers 3 obtained in Production Example 3 were diluted to 0.75% by mass and adjusted to 25° C., 35° C., 45° C., 55° C., 65° C., or 75° C. in a water bath. The viscosity was measured at 3 rpm (3 min) using a type B viscometer (manufactured by Brookfield Engineering, analog viscometer T-LVT). The rate of maintenance (%) of the viscosity at each temperature was calculated according to the following expression:

Rate of maintenance=Viscosity at each temperature/ Viscosity at 25° C.×100.

The results are shown in Table 3.

Comparative Example 1

The test was conducted by the same method as in Example 1 except that guar gum (manufactured by Wako Pure Chemical Industries, Ltd.) was used instead of the phosphorylated ultrafine cellulose fibers 3 in Example 1.

TABLE 3

|  | Example 1 Phosphorylated ultrafine cellulose fibers 3 | | Comparative Example 1 Guar gum | |
|---|---|---|---|---|
| Temperature (° C.) | Viscosity (mPa · s) | Rate of maintenance (%) | Viscosity (mPa · s) | Rate of maintenance (%) |
| 25 | 21360 | 100 | 3670 | 100 |
| 35 | 20360 | 95 | 2590 | 71 |
| 45 | 19320 | 90 | 2240 | 61 |
| 55 | 19280 | 90 | 1790 | 49 |
| 65 | 17480 | 82 | 1090 | 30 |
| 75 | 16520 | 77 | 690 | 19 |

The test using the ultrafine cellulose fibers having an amount of the phosphoric acid group of 0.6 mmol/g obtained in Production Example 3 showed more stable change in viscosity against temperatures as compared with the test using guar gum for use in existing drilling fluids.

Example 2

The phosphorylated ultrafine cellulose fibers 3 obtained in Production Example 3 were diluted to 0.2% by mass. To 1000 mL of the dilution, 50 g of bentonite (Kunigel V1, Kunimine Industries Co., Ltd.) was added, and the mixture was stirred at 3000 rpm for 60 minutes and then left standing for 24 hours to prepare sufficiently hydrated mud water. After adjustment to 25° C., 35° C., 45° C., 55° C., 65° C., or 75° C. in a water bath, the viscosity was measured by the same method as in Example 1, and the rate of maintenance was calculated. The results are shown in Table 4.

Comparative Example 2

The test was conducted by the same method as in Example 2 except that guar gum (manufactured by Wako Pure Chemical Industries, Ltd.) was used instead of the phosphorylated ultrafine cellulose fibers 3 in Example 2.

TABLE 4

|  | Example 2 Phosphorylated ultrafine cellulose fibers 3 | | Comparative Example 2 Guar gum | |
|---|---|---|---|---|
| Temperature (° C.) | Viscosity (mPa · s) | Rate of maintenance (%) | Viscosity (mPa · s) | Rate of maintenance (%) |
| 25 | 44200 | 100 | 18600 | 100 |
| 35 | 43200 | 98 | 17600 | 95 |
| 45 | 42600 | 96 | 15400 | 83 |
| 55 | 40400 | 91 | 12200 | 66 |
| 65 | 37400 | 85 | 9400 | 51 |
| 75 | 36400 | 82 | 7600 | 41 |

Use of an aqueous solution containing a mixture of the ultrafine cellulose fibers having an amount of the phosphoric acid group of 0.6 mmol/g obtained in Production Example 3 and bentonite showed more stable change in viscosity against temperatures as compared with use of an aqueous solution containing guar gum.

Example 3

The phosphorylated ultrafine cellulose fibers 3 obtained in Production Example 3 were diluted to 0.4% by mass. To 1000 mL of the dilution, 150 g of sodium chloride and 20 g of calcium chloride were added, and the mixture was stirred at 3000 rpm for 5 minutes and then adjusted to pH 12 by the addition of a 1 N aqueous sodium hydroxide solution to prepare a subterranean formation processing fluid. After adjustment to 25° C., 35° C., 45° C., 55° C., 65° C., or 75° C. in a water bath, the viscosity was measured at 3 rpm (3 min) using a type B viscometer (manufactured by Brookfield Engineering, analog viscometer T-LVT). The results are shown in Table 5.

Comparative Example 3

The test was conducted by the same method as in Example 3 except that guar gum (manufactured by Wako Pure Chemical Industries, Ltd.) was used instead of the phosphorylated ultrafine cellulose fibers 3 in Example 3.

TABLE 5

|  | Example 3 Phosphorylated ultrafine cellulose fibers 3 | | Comparative Example 3 Guar gum | |
|---|---|---|---|---|
| Temperature (° C.) | Viscosity (mPa · s) | Rate of maintenance (%) | Viscosity (mPa · s) | Rate of maintenance (%) |
| 25 | 3900 | 100 | 54 | 100 |
| 35 | 3740 | 96 | 50 | 93 |
| 45 | 3440 | 88 | 44 | 81 |
| 55 | 3410 | 87 | 32 | 59 |
| 65 | 3210 | 82 | 27 | 50 |
| 75 | 3030 | 78 | 22 | 41 |

Use of a subterranean formation processing fluid (supplemented with salts for use in subterranean formation processing fluids) containing the ultrafine cellulose fibers having 0.6 mmol/g of the phosphoric acid group in Production Example 3 showed more stable change in viscosity against temperatures as compared with use of an aqueous solution containing guar gum.

Experimental Example 13

The phosphorylated ultrafine cellulose fibers 3 obtained in Production Example 3 were diluted to 0.4% by mass. To 100 mL of the dilution, 1 g of calcium chloride as a concentrating agent was added for gelation. After filtration, the gel was compressed with filter paper to obtain a concentrate having a solid concentration of 21.4% by mass. The concentrate was dipped in 100 mL of a 0.1 N aqueous hydrochloric acid solution for 30 minutes and then washed with ion-exchange water. The concentrate was diluted to 0.2% by mass and adjusted to pH 2 with a 0.1 N aqueous hydrochloric acid or NaOH solution, and the mixture was stirred for 1 hour to re-disperse the concentrate. To 100 mL of the re-dispersed aqueous solution, 5 g of bentonite (Kunigel V1, Kunimine Industries Co., Ltd.) was added, and the mixture was stirred at 3000 rpm for 60 minutes and then left standing for 24 hours to prepare sufficiently hydrated mud water. After adjustment to 25° C. or 75° C. in a water bath, the viscosity was measured at 3 rpm (3 min) using a type B viscometer (manufactured by Brookfield Engineering, analog viscometer T-LVT). The results are shown in Table 6.

Experimental Example 14

The test was conducted by totally the same method as in Experimental Example 13 except that the pH was adjusted to 4 in Experimental Example 13.

Experimental Example 15

The test was conducted by totally the same method as in Experimental Example 13 except that the pH was adjusted to 6 in Experimental Example 13.

Experimental Example 16

The test was conducted by totally the same method as in Experimental Example 13 except that the pH was adjusted to 8 in Experimental Example 13.

Experimental Example 17

The test was conducted by totally the same method as in Experimental Example 13 except that the pH was adjusted to 10 in Experimental Example 13.

Experimental Example 18

The test was conducted by totally the same method as in Experimental Example 13 except that the pH was adjusted to 2 in Experimental Example 13.

Experimental Example 19

The test was conducted by totally the same method as in Experimental Example 15 except that 1 g of aluminum chloride as a concentrating agent was added for gelation instead of calcium chloride in Experimental Example 15.

Experimental Example 20

The test was conducted by totally the same method as in Experimental Example 19 except that the pH was adjusted to 8 in Experimental Example 19.

Experimental Example 21

The test was conducted by totally the same method as in Experimental Example 19 except that the pH was adjusted to 10 in Experimental Example 19.

Experimental Example 22

The test was conducted by totally the same method as in Experimental Example 19 except that the pH was adjusted to 12 in Experimental Example 19.

Experimental Example 23

The test was conducted by totally the same method as in Experimental Example 17 except that the step of dipping in 100 mL of a 0.1 N aqueous hydrochloric acid solution for 30 minutes, followed by washing with ion-exchange water was not carried out in Experimental Example 17.

Experimental Example 24

The test was conducted by totally the same method as in Experimental Example 21 except that the step of dipping in 100 mL of a 0.1 N aqueous hydrochloric acid solution for 30 minutes, followed by washing with ion-exchange water was not carried out in Experimental Example 21.

TABLE 6

| | Concentrating agent | pH of re-dispersion | Viscosity (mPa·s) | |
|---|---|---|---|---|
| | | | 25° C. | 75° C. |
| Experimental Example 13 | Calcium chloride | 2 | 2860 | 2200 |
| Experimental Example 14 | Calcium chloride | 4 | 2940 | 2380 |
| Experimental Example 15 | Calcium chloride | 6 | 4080 | 3140 |
| Experimental Example 16 | Calcium chloride | 8 | 41200 | 33700 |
| Experimental Example 17 | Calcium chloride | 10 | 44800 | 37600 |
| Experimental Example 18 | Calcium chloride | 12 | 43200 | 35400 |
| Experimental Example 19 | Aluminum chloride | 6 | 5020 | 3810 |
| Experimental Example 20 | Aluminum chloride | 8 | 28400 | 24700 |
| Experimental Example 21 | Aluminum chloride | 10 | 32000 | 26100 |
| Experimental Example 22 | Aluminum chloride | 12 | 43200 | 36700 |
| Experimental Example 23 | Calcium chloride | 10 | 420 | 400 |
| Experimental Example 24 | Aluminum chloride | 10 | 20 | 20 |

The test involving concentrating ultrafine cellulose fibers using calcium chloride or aluminum chloride and then re-dispersing the ultrafine cellulose fibers at pH 8 to 12 demonstrated that the high viscosity can be maintained even after the re-dispersion. Also, the viscosity stability against change in temperature was excellent.

In the test involving no washing with an acid after concentration using calcium chloride or aluminum chloride (Experimental Examples 23 and 24), the formed state of robust aggregates was maintained without dissociating a calcium ion or an aluminum ion from fine cellulose. Therefore, the re-dispersibility was very poor, and the viscosity was low.

Experimental Example 25

The phosphorylated ultrafine cellulose fibers 3 obtained in Production Example 3 were diluted to 0.4% by mass. The dilution was placed in a dryer set to 105° C. and dried until absolute dry. To 100 mL of ion-exchange water, 0.2 g of the dried product was added, and the mixture was adjusted to pH 6 with a 0.1 N aqueous hydrochloric acid solution and stirred for 1 hour. To 100 mL of the dilution containing 0.2% by mass of the ultrafine cellulose fibers, 5 g of bentonite (Kunigel V1, Kunimine Industries Co., Ltd.) was added, and the mixture was stirred at 3000 rpm for 60 minutes and then left standing for 24 hours to prepare sufficiently hydrated mud water. After adjustment to 25° C. or 75° C. in a water bath, the viscosity was measured at 3 rpm (3 min) using a type B viscometer (manufactured by Brookfield Engineering, analog viscometer T-LVT). The results are shown in Table 7.

Example 26

The phosphorylated ultrafine cellulose fibers 3 obtained in Production Example 3 were diluted to 0.4% by mass. The dilution was placed in a dryer set to 105° C. and dried until absolute dry. To 100 mL of ion-exchange water, 0.2 g of the dried product was added to prepare an aqueous solution containing 0.2% by mass of the ultrafine cellulose fibers. The pH was measured and was consequently 9.2. To 100 mL of the dilution containing 0.2% by mass of the ultrafine cellulose fibers, 5 g of bentonite (Kunigel V1, Kunimine Industries Co., Ltd.) was added, and the mixture was stirred at 3000 rpm for 60 minutes and then left standing for 24 hours to prepare sufficiently hydrated mud water. After adjustment to 25° C. or 75° C. in a water bath, the viscosity was measured at 3 rpm (3 min) using a type B viscometer (manufactured by Brookfield Engineering, analog viscometer T-LVT). The results are shown in Table 7.

TABLE 7

| | Drying method | pH of re-dispersion | Viscosity (mPa·s) 25° C. | Viscosity (mPa·s) 75° C. |
|---|---|---|---|---|
| Experimental Example 25 | Dryer | 6 | 6140 | 4780 |
| Experimental Example 26 | Dryer | 9.2 | 42600 | 35700 |

The test involving drying ultrafine cellulose fibers in a dryer and then re-dispersing the ultrafine cellulose fibers under a condition that rendered the dispersion alkaline (Experimental Example 26) demonstrated that the high viscosity can be maintained even after the re-dispersion. Also, the viscosity stability against change in temperature was excellent.

Experimental Example 27

The phosphorylated ultrafine cellulose fibers 3 obtained in Production Example 3 were diluted to 0.4% by mass. To 100 mL of the dilution, 200 mL of isopropanol was added for the gelation of the phosphorylated ultrafine cellulose fibers 3. The gel was collected by filtration through filter paper. To the gel thus collected by filtration, 200 mL of isopropanol was added and mixed therewith, and the gel was then collected by filtration through filter paper. The gel thus collected by filtration was compressed with filter paper. The solid concentration was 30.5% by mass. To 100 mL of ion-exchange water, the gel collected by filtration was added, and the mixture was stirred at 8000 rpm for 3 minutes to prepare an aqueous solution containing 0.4% by mass of the ultrafine cellulose fibers. The pH was measured and was consequently 8.5. After adjustment to 25° C. or 75° C. in a water bath, the viscosity was measured at 3 rpm (3 min) using a type B viscometer (manufactured by Brookfield Engineering, analog viscometer T-LVT). The results are shown in Table 8.

Experimental Example 28

The phosphorylated ultrafine cellulose fibers 3 obtained in Production Example 3 were diluted to 0.4% by mass. To 100 mL of the dilution, 200 mL, of isopropanol was added for the gelation of the phosphorylated ultrafine cellulose fibers 3. The gel was collected by filtration through filter paper. To the gel thus collected by filtration, 200 mL of isopropanol was added and mixed therewith, and the gel was then collected by filtration through filter paper. The gel thus collected by filtration was compressed with filter paper and then dried at 105° C. to obtain a dried product. To 100 mL of ion-exchange water, 0.4 g of the dried product was added, and the mixture was stirred at 8000 rpm for 3 minutes to prepare an aqueous solution containing 0.4% by mass of the ultrafine cellulose fibers. The pH was measured and was consequently 8.6. After adjustment to 25° C. or 75° C. in a water bath, the viscosity was measured at 3 rpm (3 min) using a type B viscometer (manufactured by Brookfield Engineering, analog viscometer T-LVT). The results are shown in Table 8.

Experimental Example 29

The phosphorylated ultrafine cellulose fibers 3 obtained in Production Example 3 were diluted to 0.4% by mass. To 100 mL of the dilution, 200 mL of isopropanol was added for the gelation of the phosphorylated ultrafine cellulose fibers 3. The gel was collected by filtration through filter paper. To the gel thus collected by filtration, 200 mL of isopropanol was added and mixed therewith, and the gel was then collected by filtration through filter paper. The gel thus collected by filtration was compressed with filter paper. The solid concentration was 30.5% by mass. To 100 mL of ion-exchange water, the obtained gel was added, and the mixture was adjusted to pH 4 with a 0.1 N aqueous hydrochloric acid solution and then stirred for 1 hour to prepare an aqueous solution containing 0.4% by mass of the ultrafine cellulose fibers. After adjustment to 25° C. or 75° C. in a water bath, the viscosity was measured at 3 rpm (3 min) using a type B viscometer (manufactured by Brookfield Engineering, analog viscometer T-LVT). The results are shown in Table 8.

Experiment 30

The phosphorylated ultrafine cellulose fibers 3 obtained in Production Example 3 were diluted to 0.4% by mass. To 100 mL of the dilution, 200 mL of isopropanol was added for the gelation of the phosphorylated ultrafine cellulose fibers 3. The gel was collected by filtration through filter paper. To the gel thus collected by filtration, 200 mL of isopropanol was added and mixed therewith, and the gel was then collected by filtration through filter paper. The gel thus collected by filtration was compressed with filter paper and then dried at 105° C. to obtain a dried product. To 100 mL of ion-exchange water, the obtained dried product was added, and the mixture was adjusted to pH 4 with a 0.1 N aqueous hydrochloric acid solution and then stirred for 1 hour to prepare an aqueous solution containing 0.4% by mass of the ultrafine cellulose fibers. After adjustment to 25° C. or 75° C. in a water bath, the viscosity was measured at 3 rpm (3 min) using a type B viscometer (manufactured by Brookfield Engineering, analog viscometer T-LVT). The results are shown in Table 8.

TABLE 8

| | Concentrating agent•Drying method | pH of re-dispersion | Viscosity (mPa · s) 25° C. | 75° C. |
|---|---|---|---|---|
| Experimental Example 27 | Isopropanol | 7 | 4400 | 3700 |
| Experimental Example 28 | Isopropanol and dryer | 7 | 4100 | 3450 |
| Experimental Example 29 | Isopropanol | 4 | 1020 | 990 |
| Experimental Example 30 | Isopropanol and dryer | 4 | 340 | 280 |

The test involving re-dispersing ultrafine cellulose fibers under a condition that rendered the dispersion alkaline (Experimental Examples 27 and 28) demonstrated that the ultrafine cellulose fibers concentrated using an organic solvent and dried can maintain a high viscosity even after the re-dispersion. Also, the viscosity stability against change in temperature was excellent.

Experimental Example 31

The phosphorylated ultrafine cellulose fibers 3 obtained in Production Example 3 were diluted to 0.4% by mass. To 100 mL of the dilution, 1 g of aluminum chloride as a concentrating agent was added for gelation. After filtration, the gel was compressed with filter paper to obtain a concentrate having a solid concentration of 21.4% by mass. To the concentrate, 2 g of isopropanol and 2 g of a 6% aqueous sodium hydroxide solution were added and well mixed therewith using a medicine spoon, and the mixture was then filtered to obtain a concentrate having a solid concentration of 23.0% by mass. To the concentrate, 2 g of isopropanol and 2 g of ion-exchange water were added and well mixed therewith using a medicine spoon, and the mixture was then filtered to obtain a concentrate having a solid concentration of 26.7%. To 100 mL of ion-exchange water, the gel collected by filtration was added, and the mixture was stirred at 8000 rpm for 3 minutes to prepare an aqueous solution containing 0.4% by mass of the ultrafine cellulose fibers. The pH was measured and was consequently 10.5. After adjustment to 25° C. or 75° C. in a water bath, the viscosity was measured at 3 rpm (3 min) using a type B viscometer (manufactured by Brookfield Engineering, analog viscometer T-LVT). The results are shown in Table 9.

The aqueous solution was diluted to 0.2% by mass, adjusted to pH 2 with a 0.1 N aqueous hydrochloric acid or NaOH solution, and stirred for 1 hour to re-disperse the concentrate. To 100 mL of the re-dispersed aqueous solution, 5 g of bentonite (Kunigel V1, Kunimine Industries Co., Ltd.) was added, and the mixture was stirred at 3000 rpm for 60 minutes and then left standing for 24 hours to prepare sufficiently hydrated mud water. After adjustment to 25° C. or 75° C. in a water bath, the viscosity was measured at 3 rpm (3 min) using a type B viscometer (manufactured by Brookfield Engineering, analog viscometer T-LVT). The results are shown in Table 6.

Experimental Example 32

The phosphorylated ultrafine cellulose fibers 3 obtained in Production Example 3 were diluted to 0.4% by mass. To 100 mL of the dilution, 1 g of aluminum chloride as a concentrating agent was added for gelation. After filtration, the gel was compressed with filter paper to obtain a concentrate having a solid concentration of 21.5% by mass. To the concentrate, 2 g of isopropanol and 2 g of ion-exchange water were added and well mixed therewith using a medicine spoon, and the mixture was then filtered to obtain a concentrate having a solid concentration of 23.2% by mass. To the concentrate, 2 g of isopropanol and 2 g of ion-exchange water were added and well mixed therewith using a medicine spoon, and the mixture was then filtered to obtain a concentrate having a solid concentration of 27.1%. To 100 mL of ion-exchange water, the gel collected by filtration was added, and the mixture was stirred at 8000 rpm for 3 minutes to prepare an aqueous solution containing 0.4% by mass of the ultrafine cellulose fibers. The pH was measured and was consequently 4. After adjustment to 25° C. or 75° C. in a water bath, the viscosity was measured at 3 rpm (3 min) using a type B viscometer (manufactured by Brookfield Engineering, analog viscometer T-LVT). The results are shown in Table 9.

Experimental Example 33

The phosphorylated ultrafine cellulose fibers 3 obtained in Production Example 3 were diluted to 0.4% by mass. To 100 mL of the dilution, 1 g of aluminum chloride as a concentrating agent was added for gelation. After filtration, the gel was compressed with filter paper to obtain a concentrate having a solid concentration of 21.4% by mass. To the concentrate, 2 g of a 6% aqueous sodium hydroxide solution was added and well mixed therewith using a medicine spoon, and the mixture was then filtered. However, the gel of the ultrafine cellulose fibers was swollen due to its high water retention property and was thus unable to be dehydrated. The results are shown in Table 9.

TABLE 9

| | Drying method | Success or failure of concentration | pH of re-dispersion | Viscosity (mPa · s) 25° C. | 75° C. |
|---|---|---|---|---|---|
| Experimental Example 31 | Aluminum chloride, isopropanol, and sodium hydroxide | Success | 10.5 | 6880 | 5640 |
| Experimental Example 32 | Aluminum chloride and isopropanol | Success | 4 | 1020 | 940 |
| Experimental Example 33 | Aluminum chloride and sodium hydroxide | Failure | — | — | — |

In Experimental Example 31, the presence of isopropanol prevented the concentrate from being swollen when aluminum chloride was removed using sodium hydroxide from the ultrafine cellulose fibers concentrated with the aluminum chloride. This concentrate was found to be able to maintain a high viscosity even after the re-dispersion. Also, the viscosity stability against change in temperature was excellent. In Experimental Example 32, the aluminum ion present in the concentrate was unable to be removed without the treatment with sodium hydroxide, and the re-dispersibility was insufficient. In Experimental Example 33, the concentrate of the ultrafine cellulose fibers was swollen due to the absence of isopropanol upon release of an aluminum ion form fine cellulose surface and was thus unable to be dehydrated.

Experimental Example 34

The phosphorylated ultrafine cellulose fibers 3 (0.5% by mass) obtained in Production Example 3 were adjusted to 0.4% by mass of the ultrafine cellulose fibers and 1% by mass of sodium chloride by the addition of an aqueous NaCl solution, and the mixture was stirred at 8000 rpm for 3 minutes. After adjustment to 25° C. or 75° C. in a water bath, the viscosity was measured at 3 rpm (3 min) using a type B viscometer (manufactured by Brookfield Engineering, analog viscometer T-LVT). The results are shown in Table 10.

Experimental Example 35

The test was conducted in the same way as in Experimental Example 34 except that the adjustment was made to 25% by mass of sodium chloride. The results are shown in Table 10.

Experimental Example 36

The test was conducted in the same way as in Experimental Example 34 except that the adjustment was made to 2% by mass of calcium chloride. The results are shown in Table 10.

Experimental Example 37

The test was conducted in the same way as in Experimental Example 34 except that the adjustment was made to 2% by mass of potassium chloride. The results are shown in Table 10.

Experimental Example 38

The concentrate of the ultrafine cellulose fibers (solid concentration: 30.5% by mass) obtained in Experimental Example 27 was diluted to 1.8% by mass with tap water. The dilution was adjusted to 0.4% by mass of the ultrafine cellulose fibers and 1% by mass of sodium chloride by the addition of an aqueous NaCl solution, and the mixture was stirred at 8000 rpm for 3 minutes. After adjustment to 25° C. or 75° C. in a water bath, the viscosity was measured at 3 rpm (3 min) using a type B viscometer (manufactured by Brookfield Engineering, analog viscometer T-LVT). The results are shown in Table 10.

Experimental Example 39

The test was conducted in the same way as in Experimental Example 38 except that the adjustment was made to 25% by mass of sodium chloride. The results are shown in Table 10.

Experimental Example 40

The test was conducted in the same way as in Experimental Example 38 except that the adjustment was made to 2% by mass of calcium chloride. The results are shown in Table 10.

Experimental Example 41

The test was conducted in the same way as in Experimental Example 38 except that the adjustment was made to 2% by mass of potassium chloride. The results are shown in Table 10.

Experimental Example 42

The dried product of the ultrafine cellulose fibers obtained in Experimental Example 28 was diluted to 1.8% by mass with tap water. The dilution was adjusted to 0.4% by mass of the ultrafine cellulose fibers and 1% by mass of sodium chloride by the addition of an aqueous NaCl solution, and the mixture was stirred at 8000 rpm for 3 minutes. After adjustment to 25° C. or 75° C. in a water bath, the viscosity was measured at 3 rpm (3 min) using a type B viscometer (manufactured by Brookfield Engineering, analog viscometer T-LVT). The results are shown in Table 10.

Experimental Example 43

The concentrate of the ultrafine cellulose fibers (solid concentration: 30.5% by mass) obtained in Experimental Example 27 was adjusted to 0.4% by mass of the ultrafine cellulose fibers and 1% by mass of sodium chloride by the addition of an aqueous NaCl solution, and the mixture was stirred at 8000 rpm for 3 minutes. After adjustment to 25° C. or 75° C. in a water bath, the viscosity was measured at 3 rpm (3 min) using a type B viscometer (manufactured by Brookfield Engineering, analog viscometer T-LVT). The results are shown in Table 10.

Experimental Example 44

The dried product of the ultrafine cellulose fibers obtained in Experimental Example 28 was adjusted to 0.4% by mass of the ultrafine cellulose fibers and 1% by mass of sodium chloride by the addition of an aqueous NaCl solution, and the mixture was stirred at 8000 rpm for 3 minutes. After adjustment to 25° C. or 75° C. in a water bath, the viscosity was measured at 3 rpm (3 min) using a type B viscometer (manufactured by Brookfield Engineering, analog viscometer T-LVT). The results are shown in Table 10.

Experimental Example 45

The test was conducted in the same way as in Experimental Example 34 except that no salt was added. The results are shown in Table 10.

TABLE 10

|  | Concentration of ultrafine cellulose fiber dispersion before mixing with salt (% by mass) | Type of salt | Salt concentration (% by mass) | Viscosity (mPa · s) 25° C. | Viscosity (mPa · s) 75° C. |
|---|---|---|---|---|---|
| Experimental Example 34 | 0.5 | Sodium chloride | 1 | 3800 | 3450 |
| Experimental Example 35 | 0.5 | Sodium chloride | 25 | 2750 | 2300 |
| Experimental Example 36 | 0.5 | Calcium chloride | 2 | 4200 | 3400 |
| Experimental Example 37 | 0.5 | Potassium chloride | 2 | 3850 | 3010 |
| Experimental Example 38 | 1.8 | Sodium chloride | 1 | 3420 | 2780 |
| Experimental Example 39 | 1.8 | Sodium chloride | 25 | 2650 | 2220 |
| Experimental Example 40 | 1.8 | Calcium chloride | 2 | 3210 | 2830 |
| Experimental Example 41 | 1.8 | Potassium chloride | 2 | 3330 | 2640 |
| Experimental Example 42 | 1.8 | Sodium chloride | 1 | 3280 | 2550 |
| Experimental Example 43 | 30.5 | Sodium chloride | 1 | Viscosity immeasurable because not dispersed | |
| Experimental Example 44 | 100 | Sodium chloride | 1 | Viscosity immeasurable because not dispersed | |
| Experimental Example 45 | 0.5 | Sodium chloride | 1 | 3900 | 3030 |

A fluid obtained by diluting the concentrate or the dried product of the ultrafine cellulose fibers with water having a small salt content, followed by the addition of a salt exerted adequate viscosity even in salt water and was also excellent in temperature stability. On the other hand, the concentrate or the dried product of the ultrafine cellulose fibers directly stirred in salt water was not dispersed, resulting in precipitates. Thus, it was found that the addition of a salt after sufficient decrease of the solid concentration of the ultrafine cellulose fiber dispersion is important for exerting viscosity in salt water.

INDUSTRIAL APPLICABILITY

According to the present invention, high-temperature mud water for use in subterranean formation processing is supplemented with ultrafine cellulose fibers. The present invention is expected to maintain a high viscosity even at a high temperature and to exert a high water stopping property, and is particularly useful in the processing of a very deep subterranean formation. The present invention can also provide a composition that exhibits high viscosity and temperature stability and has excellent handleability even when used as a concentrate or a dried product.

The present invention provides a thickener comprising ultrafine cellulose fibers as an active ingredient. The thickener can also be provided as a concentrate liquid or a dried product. Such a concentrate liquid or a dried product exhibits high viscosity and temperature stability and has excellent handleability when used. The thickener can be expected to be applied to various products, for example, cosmetics, food products (including drinks), pharmaceutical products, paints, and chemicals (agricultural chemicals, etc.).

The invention claimed is:

1. A subterranean formation processing composition comprising cellulose fibers,
    wherein the composition contains ultrafine cellulose fibers having 0.14 to 2.5 mmol/g of a substituent,
    wherein the cellulose fibers have 5% or more of a non-crystalline region,
    wherein an average fiber width of the cellulose fibers is 2 to 1000 nm,
    wherein the substituent is introduced by esterification reaction, and
    wherein the substituent is a phosphoric acid group or a sulfone group.

2. The composition according to claim 1, wherein the viscosity at a temperature of 30° C. to 80° C. is 60% or more with respect to the viscosity at 25° C. when the composition is dispersed in water such that the solid concentration of the cellulose fibers is 0.2 to 0.4% by mass.

3. The composition according to claim 1, wherein the composition has a water stopping property.

4. The composition according to claim 1, wherein the cellulose fibers comprise at least one of papermaking pulp, cotton-based pulp, non-wood-based pulp, and cellulose isolated from sea squirt or seaweed,
    wherein the papermaking pulp comprises at least one of hardwood kraft pulp, softwood kraft pulp, chemical pulp, semichemical pulp, mechanical pulp, non-wood pulp, and deinking pulp;
    wherein the cotton-based pulp comprises at least one of cotton linter and cotton lint; and
    wherein the non-wood-based pulp comprises at least one of linen, straw, and bagasse.

5. A subterranean formation processing fluid comprising the composition according to claim 1.

6. A fracturing fluid comprising the composition according to claim 1.

7. A concentrate liquid or a dried product of a composition according to claim 1.

8. The concentrate liquid or the dried product according to claim 7, wherein the solid concentration of the cellulose fibers is 5% by mass or more and 100% by mass or smaller.

9. A fluid comprising a dispersion of ultrafine cellulose fibers prepared by dispersing a concentrate or a dried product according to claim 7 in a liquid, wherein the pH of the dispersion is 7 to 14 when the ultrafine cellulose fibers have no or negative surface charge, and the pH of the dispersion is 2 to 7 when the ultrafine cellulose fibers have positive surface charge.

10. A concentrate liquid or the dried product of a composition comprising cellulose fibers, wherein
- the composition contains ultrafine cellulose fibers having 0.14 to 2.5 mmol/g of a substituent,
- the solid concentration of the cellulose fibers is 5% by mass or more and 100% by mass or smaller, and
- the composition is produced by a production method comprising a step of adding a concentrating agent selected from the group consisting of a salt of a polyvalent metal, a cationic surfactant, and a cationic polymer coagulant to the composition according to claim 1 to adjust the solid concentration of the cellulose fibers to 5% by mass or more.

11. The concentrate liquid or the dried product according to claim 10, wherein the production method further comprises a step of dipping the concentrating agent-containing concentrate liquid or dried product in which the solid concentration of the cellulose fibers is 5% by mass or more, in an acidic liquid to remove the concentrating agent.

12. The concentrate liquid or the dried product according to claim 10, wherein the production method further comprises a step of dipping the concentrating agent-containing concentrate liquid or dried product in which the solid concentration of the cellulose fibers is 5% by mass or more, in a liquid comprising an organic solvent.

* * * * *